(12) United States Patent
Nishimura et al.

(10) Patent No.: US 10,945,557 B2
(45) Date of Patent: Mar. 16, 2021

(54) HEATING/STIRRING COOKER

(71) Applicant: Panasonic Intellectual Property Management Co., Ltd., Osaka (JP)

(72) Inventors: Makoto Nishimura, Osaka (JP); Katsuyuki Ohta, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 295 days.

(21) Appl. No.: 16/091,124

(22) PCT Filed: Jun. 12, 2017

(86) PCT No.: PCT/JP2017/021580
§ 371 (c)(1),
(2) Date: Oct. 4, 2018

(87) PCT Pub. No.: WO2017/217352
PCT Pub. Date: Dec. 21, 2017

(65) Prior Publication Data
US 2019/0125124 A1   May 2, 2019

(30) Foreign Application Priority Data

Jun. 15, 2016 (JP) .............................. JP2016-118897
Feb. 15, 2017 (JP) .............................. JP2017-026100

(51) Int. Cl.
*A47J 36/16* (2006.01)
*A47J 27/00* (2006.01)
(Continued)

(52) U.S. Cl.
CPC .............. *A47J 36/165* (2013.01); *A47J 27/00* (2013.01); *A47J 27/004* (2013.01); *A47J 36/32* (2013.01);
(Continued)

(58) Field of Classification Search
CPC .......... A47J 36/165; A47J 36/32; A47J 27/00; A47J 27/004; A47J 43/0465;
(Continued)

(56) References Cited

U.S. PATENT DOCUMENTS 6,435,706 B1   8/2002   Bertolotti et al.
2006/0219100 A1  10/2006   Gelfand
(Continued)

FOREIGN PATENT DOCUMENTS

DE     11 2014 001 854    12/2015
JP         6-030264 Y      8/1994
(Continued)

OTHER PUBLICATIONS

Extended European Search Report dated Apr. 3, 2019 in European Application No. 17813248.6.
(Continued)

*Primary Examiner* — Brian W Jennison
(74) *Attorney, Agent, or Firm* — Wenderoth, Lind & Ponack, L.L.P.

(57) ABSTRACT

A cooker includes: a main body; a container inside the main body; a stirring body having a blade for stirring an object to be cooked in the container and a magnet at a position facing an inner bottom part of the container; a magnetic field generator inside the main body and configured to generate a rotating magnetic field so that a rotational force of the rotating magnetic field acts on the magnet; and a controller inside the main body and configured to control the magnetic (Continued)

field generator so that: (i) a direction of rotation of the rotating magnetic field is switched between a forward rotation direction and a reverse rotation direction that is reverse to the forward rotation direction; and (ii) a number M of rotations in the reverse rotation direction is less than a number N of rotations in the forward rotation direction.

8 Claims, 18 Drawing Sheets

(51) Int. Cl.
  *A47J 43/08* (2006.01)
  *A47J 43/07* (2006.01)
  *A47J 43/046* (2006.01)
  *A47J 36/32* (2006.01)
  *B01F 13/08* (2006.01)
  *B01F 15/00* (2006.01)

(52) U.S. Cl.
  CPC ....... *A47J 43/0465* (2013.01); *A47J 43/0716* (2013.01); *A47J 43/085* (2013.01); *B01F 13/0854* (2013.01); *B01F 15/00389* (2013.01); *B01F 2215/0026* (2013.01)

(58) Field of Classification Search
  CPC ... A47J 43/0716; A47J 43/085; B01F 3/0854; B01F 15/00389; B01F 2215/0026
  See application file for complete search history.

(56) References Cited

U.S. PATENT DOCUMENTS

| | | | |
|---|---|---|---|
| 2010/0010675 A1* | 1/2010 | Anderberg | B01F 15/00201 700/265 |
| 2015/0013552 A1* | 1/2015 | Tsang | A47J 43/0465 99/453 |
| 2016/0073814 A1* | 3/2016 | Kiriishi | A47J 43/0722 99/348 |

FOREIGN PATENT DOCUMENTS

| | | |
|---|---|---|
| JP | 8-035664 | 2/1996 |
| JP | 2000-126577 | 5/2000 |
| JP | 2001-062274 | 3/2001 |
| JP | 2002-028625 | 1/2002 |
| JP | 2003-001085 | 1/2003 |
| JP | 2007-069094 | 3/2007 |
| JP | 2008-534215 | 8/2008 |
| JP | 2011-005381 | 1/2011 |
| JP | 2011/229612 | 11/2011 |
| WO | 2014/162743 | 10/2014 |

OTHER PUBLICATIONS

International Search Report of PCT application No. PCT/JP2017/021580 dated Sep. 5, 2017.

* cited by examiner

HEATING/STIRRING COOKER

This application is a U.S. national stage application of the PCT International Application No. PCT/JP2017/021580 filed on Jun. 12, 2017, which claims the benefit of foreign priority of Japanese patent applications No. 2016-118897 filed on Jun. 15, 2016 and No. 2017-026100 filed on Feb. 15, 2017, the contents all of which are incorporated herein by reference.

TECHNICAL FIELD

The present disclosure relates to a heating/stirring cooker provided with: a container to be heated; and a stirring body for stirring an object to be cooked accommodated in the container. Specifically, the present disclosure relates to a heating/stirring cooker including a stirring body which is disposed inside the container and which rotates in response to a rotating magnetic field from an outside of the container.

BACKGROUND ART

There has conventionally been proposed a rotary heating cooker that inductively heats a pot placed above a coil, which is provided to an induction heating cooker, due to a magnetic field generated from the coil, and that rotates a rotary blade having a permanent magnet or a magnetized body (see PTL 1, for example).

FIG. 21 is a sectional view showing the conventional rotary heating cooker disclosed in PTL 1. Main body 101 of the rotary heating cooker is provided with a coil 104 which is segmented into a plurality of sections and which is connected to inverter 103. Coil 104 which is segmented into a plurality of sections generates a high-frequency magnetic field, a low-frequency magnetic field, or a mixed magnetic field which is a mixture of the high-frequency magnetic field and the low-frequency magnetic field, according to an output from inverter 103. With this configuration, pot 105 formed from non-magnetic metal is inductively heated, and rotary blade 107 disposed inside pot 105 and including magnet 106 inside is rotated due to a rotating magnetic field generated by coil 104.

Further, there has been proposed an electric rice cooker that includes: a rice cooking pot which is to be heated; and a stirring body provided inside the pot, wherein the stirring body is driven to rotate due to magnetic coupling between a driven-side magnet of the stirring body and a rotating magnetic field generated by a rotational driving device of a main body of the rice cooker (see PTL 2, for example).

FIG. 22 is a sectional view showing the conventional electric rice cooker disclosed in PTL 2. When stirring motor 204 is driven, drive-side magnet 205 generates a rotating magnetic field. Due to magnetic coupling between the rotating magnetic field and stirring blade 201, stirring blade 201 can be rotationally driven in a contactless manner. Therefore, rotational driving device 202 does not penetrate rice cooking pot 203, which prevents a water leakage from a location where rotational driving device 202 penetrates.

In addition, configurations disclosed in PTL 3 to PTL 5 have been proposed as means for detecting a rotational operation of a stirring body in various types of stirring devices using magnetic coupling.

A stirring member in a stirring device disclosed in PTL 3 is provided with a detector composed of a permanent magnet. The detector is provided at a position offset from a rotation center of the stirring member and rotates integrally with the stirring member. The stirring device also has a sensor that detects a position of the detector in response to magnetism of the detector. With this configuration, the rotating speed of the stirring member is detected, and the rotating speed of the stirring member is controlled based on the detection result.

A stirring device in PTL 4 includes a plurality of magnetic detection sensors that is disposed below a container so as to be magnetically isolated from a drive magnet and that detects magnetism of a stirring rotor. The magnetic detection sensors are connected to one another by a parallel circuit. According to this configuration, deviation of the stirring rotor in the container can be detected, and the stirring rotor can be returned to its original position by performing control such as control for temporarily rotating the drive magnet at low speed.

FIG. 23 is a sectional view showing a conventional stirring device disclosed in PTL 5. The stirring device shown in FIG. 23 includes magnetic operating body 302 disposed inside container 301, and drive device 303 provided below container 301 for rotating magnetic operating body 302. Drive device 303 is supported by force sensor 304. Force sensor 304 continuously monitors an apparent weight of drive device 303, thereby detecting a magnitude of magnetic force between magnetic operating body 302 and drive device 303. With this configuration, a user can recognize that magnetic operating body 302 begins to stop rotating or completely deviates, without checking the inside of container 301 of the stirring device.

However, in heating/stirring cookers, to obtain a large torque for stirring an object to be cooked by employing the conventional stirring devices using magnetic coupling, for example, devices may be increased in size, which is a problem to be addressed. Further, in heating/stirring cookers, there is still room for improvement from the viewpoint of further improving convenience for a user.

CITATION LIST

Patent Literatures

PTL 1: Unexamined Japanese Patent Publication No. H08-35664

PTL 2: Unexamined Japanese Patent Publication No. 2011-229612

PTL 3: Unexamined Japanese Patent Publication No. 2011-5381

PTL 4: Unexamined Japanese Patent Publication No. 2000-126577

PTL 5: Unexamined Japanese Patent Publication No. 2001-62274

SUMMARY OF THE INVENTION

The present disclosure provides a heating/stirring cooker which can efficiently stir an object to be cooked to further improve usability without an increase in size of devices.

Specifically, the heating/stirring cooker includes: a main body; a container that is disposed inside the main body and accommodates an object to be cooked; a stirring body that is disposed inside the container so as to be detachable from the container, the stirring body having a blade for stirring the object to be cooked in the container and a magnet disposed at a position facing an inner bottom part of the container in a state in which the stirring body is disposed inside the container; a magnetic field generator that is disposed inside the main body and generates a rotating magnetic field so that a rotational force of the rotating magnetic field acts on the magnet; and a controller that is disposed inside the main body and controls the magnetic field generator. The controller is configured to control the magnetic field generator so that a direction of rotation of the rotating magnetic field is switched between a forward rotation direction and a reverse rotation direction that is reverse to the forward rotation direction, and that number M of rotations in the reverse rotation direction is less than number N of rotations in the forward rotation direction.

According to the abovementioned configuration, the stirring body rotates in the reverse rotation direction as well as in the forward rotation direction at different rates during stirring of the object to be cooked, whereby the rotational force of the stirring body can also be exerted on the object to be cooked from a direction reverse to the forward rotation direction. Thus, the heating/stirring cooker can stir the object to be cooked while eliminating a factor that causes an increase in load applied to the stirring body due to the object to be cooked being unevenly distributed. In addition, when the stirring body decelerates or stops due to an excess load being applied to the stirring body, the stirring body rotates in the reverse rotation direction as well as in the forward rotation direction. Therefore, the stirring body can be released from such a state without human intervention, and can continue stirring of the object to be cooked.

Figure 1:
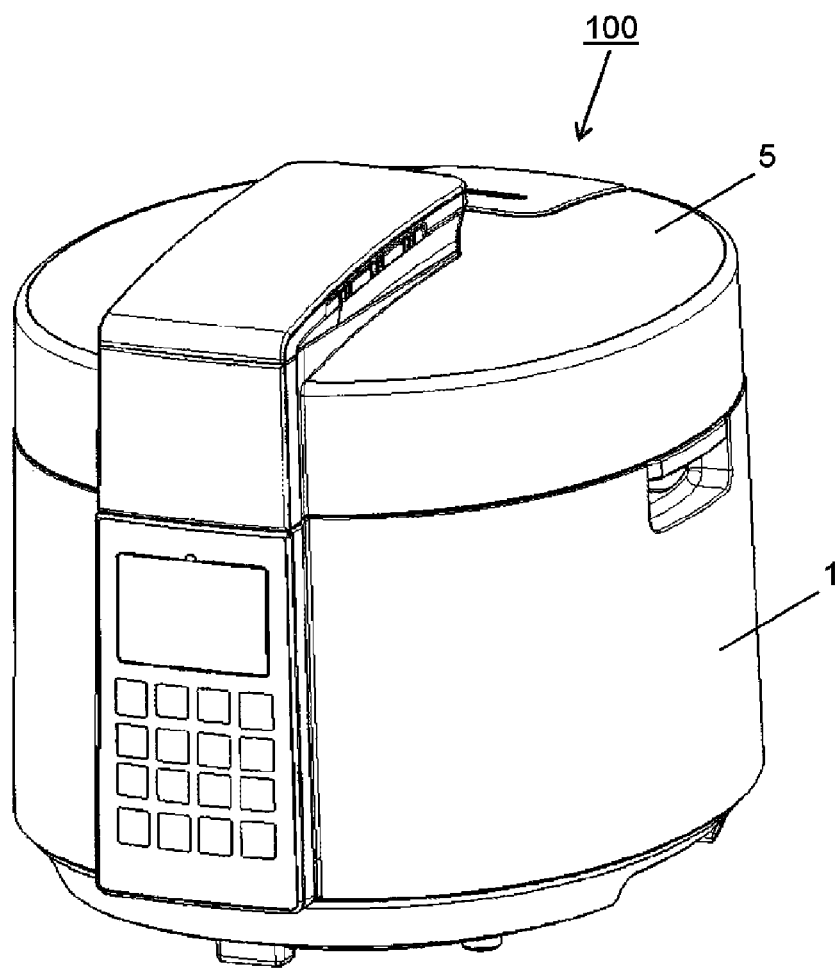
FIG. 1 is a perspective view showing an overall configuration of a heating/stirring cooker according to an exemplary embodiment of the present disclosure.

DESCRIPTION OF EMBODIMENT (Findings which are a Basis of the Present Disclosure)

The inventors of the present invention have made earnest studies on heating/stirring cookers using magnetic coupling for further improving their convenience for a user and reducing an increase in size, and have consequently obtained the following findings.

It has been found that, when cooking is actually conducted with a conventional heating/stirring cooker, the following phenomena occur.

For example, considering that objects to be cooked mainly including solids are to be stirred, the objects to be cooked are different in size, dimension, hardness, and other factors. Therefore, a load applied to the stirring body varies from moment to moment, during stirring, with a change in a manner in which the objects to be cooked overlap one another or in a manner in which the objects to be cooked are in contact with a container.

The load applied to the stirring body also varies from moment to moment due to a change in hardness of the objects to be cooked, migration or evaporation of moisture, or the like as a result of heating of the objects to be cooked.

When a portion of the objects to be cooked get stuck between a blade portion of the stirring body and an inner periphery of the container due to the rotational operation of the blade portion, the objects to be cooked which get stuck apply resistance to the blade portion, resulting in that a rotational load of the stirring body increases. In this case, when the rotational load of the stirring body exceeds a drive torque, the stirring body becomes non-rotatable (locked). If heating is continued with this state, uneven heating, scorching, or the like occurs on the objects to be cooked, which leads to failed cooking.

In view of this, when using the conventional heating/stirring cooker, a user needs to occasionally check whether the stirring body stops during cooking. Further, when the stirring body stops, the user needs to remove a factor that causes an increase in load.

If generation of a sufficiently large torque is intended for stirring objects to be cooked to address a variation in load applied to the stirring body as described above, devices may be increased in size. Specifically, a motor for generating a driving force for stirring, a power transmission unit for transmitting the driving force to the stirring body, a power supply for supplying power to the motor, and the other components may be increased in size, and the weight of the devices may be increased.

For example, in the stirring device disclosed in PTL 1, a large magnetic gap exists between the coil and the permanent magnet provided to the rotary blade because of a thickness of a placement plate on which the pot is placed and the thickness of the pot. Actually, the magnetic gap is about 5 mm to 15 mm. The larger the magnetic gap is, the lower the magnetic coupling is. Therefore, to ensure a large rotational torque, a configuration is needed which causes a magnetic flux generated from the coil to sufficiently interlink with a magnetic flux generated by the permanent magnet. This configuration may entail a problem of an increase in size of devices.

Further, when the objects to be cooked being heated are stirred with a large torque, the objects to be cooked may fall apart, for example, which may lead to deterioration in the result of the cooking.

On the contrary, when the objects to be cooked are stirred by a blade portion which is configured to reduce resistance applied from the objects to be cooked, a stirring action to the objects to be cooked is limited, so that a stirring effect during cooking may be reduced.

Notably, the stirring effect during cooking provides reduction in uneven heating and scorching, even when objects mainly including solids which are unlikely to generate a convection flow due to less moisture are cooked or objects which are likely to be scorched due to evaporation of moisture are cooked, for example.

During normal cooking with a pot, a user occasionally or continuously conducts operations such as turning over the objects to be cooked, stirring them, gathering them, or distributing them, by means of cooking utensils such as chopsticks or spatula to uniformly heat the objects to be cooked. In the heating/stirring cooker, the blade portion of the stirring body physically acts on the objects to be cooked to obtain an effect equivalent to the effect of the above-mentioned operations.

Uneven heating and scorching during cooking are caused by a complex web of factors such as an installment position of a heating unit such as a heater for heating the container, difference in thermal conductivity, position of objects to be cooked or presence of convection in the container, and heat capacity due to the density of the objects to be cooked. Therefore, to reduce uneven heating and scorching of roughly-chopped objects to be cooked having a variety of shapes and sizes, it is necessary to positively vary positions of the objects to be cooked in the container and to positively vary contact surfaces of the objects to be cooked with the container, so as to prevent the objects to be cooked from being heated while staying on one location.

In view of this, the inventors of the present invention have come up with an idea that, if objects to be cooked can be efficiently stirred, convenience can be improved without an increase in size of devices.

In the conventional stirring device, even if the stirring body becomes non-rotatable, the drive-side magnet continues to rotate. Therefore, such a situation may occur where the same poles of the magnet in the stirring body and the magnet in the drive-side device face each other, which increases a repulsive force in magnetic coupling. Therefore, the stirring body may lose synchronization with the rotation of the rotating magnetic field and thereby deviate from the rotation center.

As one method for avoiding such a situation, it is considered that the operation of the stirring body is detected.

For example, in the configurations disclosed in PTL 3 and PTL 4, the deviation of the stirring body can be detected after the stirring body deviates. However, in the heating/stirring cooker, once the stirring body deviates, objects to be cooked become a resistance, and thus, it is hard to return the stirring body to its original position.

Therefore, the inventors of the present invention have conceived that, if a possibility of deviation of the stirring body can be detected or reduced before the stirring body deviates, the stirring operation can be continued and convenience for a user can be improved.

In the configuration in PTL 5, an apparent weight applied to the drive device in the direction of the rotation axis (in the vertical direction) varies according to a repulsive force generated in magnetic coupling. Therefore, it is possible to detect that loss of synchronization of the stirring body is just about to occur. However, a configuration for supporting the drive device so that the drive device is vertically movable and a configuration for detecting the weight of the drive device are required, resulting in entailing a complex structure and an increase in size of devices.

The inventors of the present invention have decided to provide the following disclosure based on these novel findings.

The heating/stirring cooker according to one aspect of the present disclosure includes: a main body; a container that is disposed inside the main body and accommodates an object to be cooked; a stirring body that is disposed inside the container so as to be detachable from the container, the stirring body having a blade for stirring the object to be cooked in the container and a magnet disposed at a position facing an inner bottom part of the container in a state in which the stirring body is disposed inside the container; a magnetic field generator that is disposed inside the main body and generates a rotating magnetic field so that a rotational force of the rotating magnetic field acts on the magnet; and a controller that is disposed inside the main body and controls the magnetic field generator. The controller is configured to control the magnetic field generator so that a direction of rotation of the rotating magnetic field is switched between a forward rotation direction and a reverse rotation direction that is reverse to the forward rotation direction, and that number M of rotations in the reverse rotation direction is less than number N of rotations in the forward rotation direction.

With this configuration, the magnetic field generator is controlled so that a direction of rotation of the rotating magnetic field is switched between a forward rotation direction and a reverse rotation direction that is reverse to the forward rotation direction, and that number M of rotations in the reverse rotation direction is less than number N of rotations in the forward rotation direction. Accordingly, a factor that causes an increase in rotational load can be eliminated and stirring can be continued. Thus, the object to be cooked can be efficiently stirred, whereby an increase in size of devices can be prevented. Accordingly, usability of the heating/stirring cooker can be improved.

In the heating/stirring cooker according to another aspect of the present disclosure, the controller may be configured to switch the direction of rotation of the rotating magnetic field, at least either when the rotating magnetic field makes a set number of rotations which has been set in advance for the forward rotation direction and the reverse rotation direction or when a change in a rotational state of the stirring body is detected.

With this configuration, the direction of rotation of the rotating magnetic field is switched, at least either when the rotating magnetic field makes a set number of rotations which has been set in advance for the forward rotation direction and the reverse rotation direction or when a change in a rotational state of the stirring body is detected, whereby an increase in load can be reduced, or even if the stirring body stops, a factor that causes an increase in rotational load can be efficiently eliminated and stirring can be continued.

In the heating/stirring cooker according to another aspect of the present disclosure, in a case where the direction of rotation of the rotating magnetic field is switched when the rotating magnetic field makes the set number of rotations which has been set in advance for the forward rotation direction and the reverse rotation direction, a ratio of number M of rotations in the reverse rotation direction to number N of rotations in the forward rotation direction may be within a range from 0.1 to 0.9.

With this configuration, the number of rotations in the forward rotation direction can be increased without an increase in load, whereby the object to be cooked can be efficiently stirred.

In the heating/stirring cooker according to another aspect of the present disclosure, in the case where the direction of rotation of the rotating magnetic field is switched when the rotating magnetic field makes the set number of rotations which has been set in advance for the forward rotation direction and the reverse rotation direction, number M of rotations may be within a range from 1 to 2.

Due to the configuration where the number of rotations in the reverse rotation direction is set within a range from 1 to 2, the number of rotations in the reverse rotation direction can be minimized within a range where reduction in an increase in load can be expected, whereby the object to be cooked can be efficiently stirred.

In the heating/stirring cooker according to another aspect of the present disclosure, the magnetic field generator may have a device-side magnet disposed at a position facing the magnet and a rotational driving unit that rotates the device-side magnet, and the magnetic field generator may further include a detector disposed inside the main body and near the device-side magnet, the detector detecting a magnetic coupling state between the magnet and the device-side magnet to detect a change in a rotational state of the stirring body.

With this configuration, a change in the rotational state of the stirring body can be detected with a simple structure, and thus, loss of synchronization of the stirring body or deviation of the stirring body from a rotation center can be detected.

In the heating/stirring cooker according to another aspect of the present disclosure, the detector may detect a change in flow of magnetic force in magnetic coupling between the magnet and the device-side magnet.

With this configuration, a change in the rotational state of the stirring body can be detected with a simple configuration by utilizing a change in flow of magnetic force in magnetic coupling.

In the heating/stirring cooker according to another aspect of the present disclosure, the controller may be configured to switch the direction of rotation of the rotating magnetic field to the reverse rotation direction, when the detector detects a change in flow of magnetic force in magnetic coupling between the magnet and the device-side magnet with the rotating magnetic field rotating in the forward rotation direction.

With this configuration, even if the rotation of the stirring body stops, such a situation is detected, and the stirring body is rotated in the reverse rotation direction, whereby the stirring body can be driven in a direction away from the object to be cooked which causes the stirring body to stop its rotation. Therefore, the stirring body can be released from its stopped state.

In the heating/stirring cooker according to another aspect of the present disclosure, number M of rotations in the reverse rotation direction after the direction of rotation of the rotating magnetic field is switched to the reverse rotation direction may be less than or equal to 2, and when the rotating magnetic field makes M rotations, the direction of rotation of the rotating magnetic field may be switched to the forward rotation direction.

With this configuration, a mass of the object to be cooked which causes the stirring body to stop can be broken up and distributed, and stirring body can continue stirring by rotating again in the forward rotation direction.

In the heating/stirring cooker according to another aspect of the present disclosure, the detector may be provided outside the device-side magnet in a radial direction with respect to a rotation center of the device-side magnet so as to face the device-side magnet, the detector detecting a change in flow of magnetic force outside the device-side magnet.

With this configuration, a change in flow of magnetic force can be detected with a simple configuration.

In the heating/stirring cooker according to another aspect of the present disclosure, the blade may be configured to gather the object to be cooked during rotation in the forward rotation direction and to break up the gathered object to be cooked during rotation in the reverse rotation direction.

With this configuration, the objects to be cooked can be efficiently stirred, by which a mass of objects to be cooked which has caused an increase in rotational load can be broken up.

An exemplary embodiment of the present invention will be described below with reference to the drawings. Note that the present invention is not limited by the exemplary embodiment.

Exemplary Embodiment

[1. Overall Configuration of Heating/Stirring Cooker]

Figure 2:
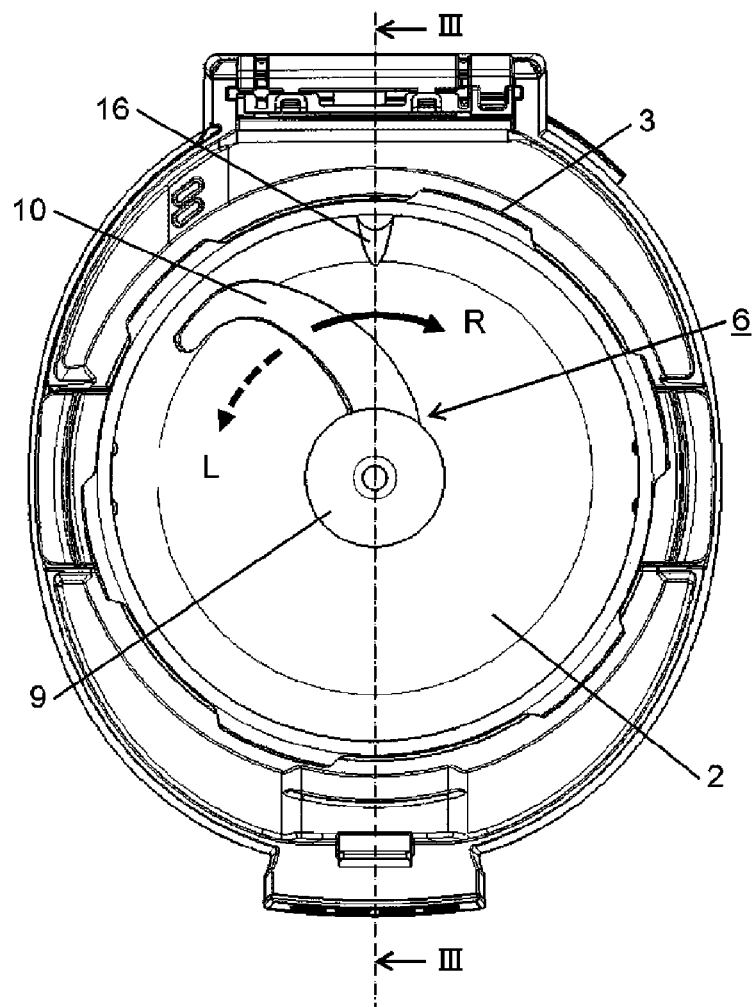
FIG. 2 is a plan view of the heating/stirring cooker according to the exemplary embodiment with a lid being removed.
Figure 3:
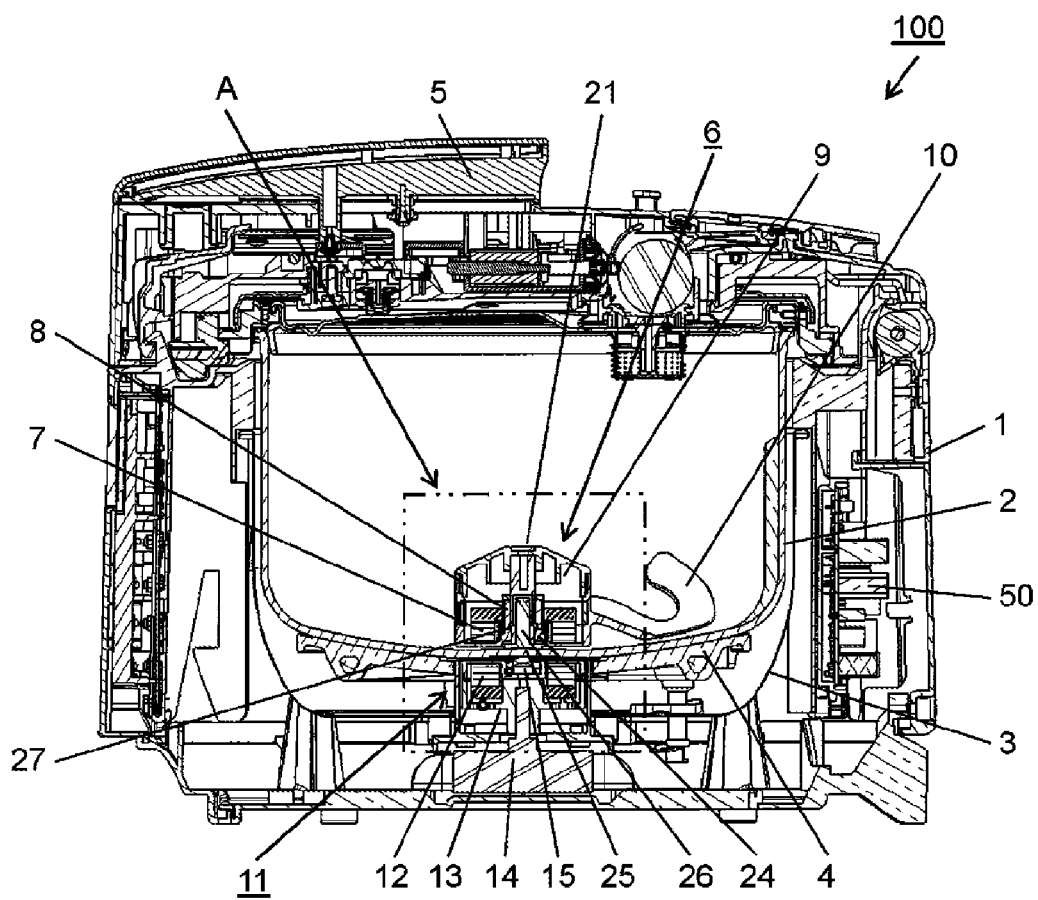
FIG. 3 is a longitudinal sectional view along line III-III in FIG. 2.
Figure 4:
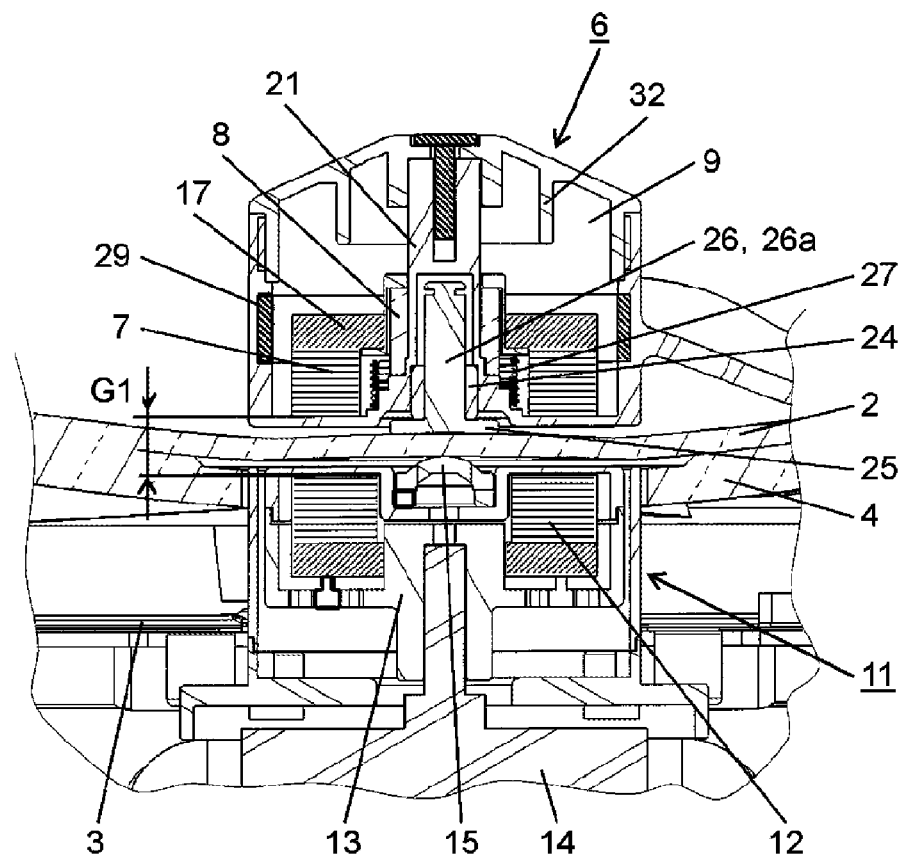
FIG. 4 is a sectional view of enlarged portion A in FIG. 3 with a magnetic gap being G1.
Figure 5:
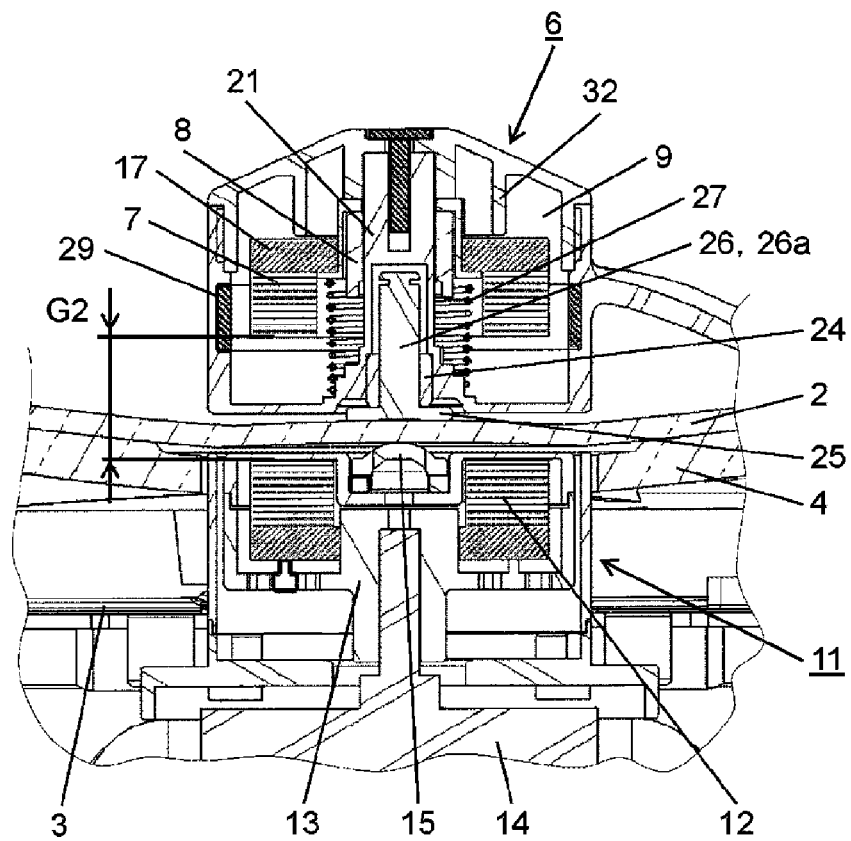
FIG. 5 is a sectional view of enlarged portion A in FIG. 3 with a magnetic gap being G2.

FIG. 1 is a perspective view showing an overall configuration of a heating/stirring cooker according to an exemplary embodiment of the present disclosure. FIG. 2 is a plan view of the heating/stirring cooker according to the exemplary embodiment with a lid being removed. FIG. 3 is a longitudinal sectional view along line III-III in FIG. 2. FIGS. 4 and 5 are each a sectional view of enlarged portion A in FIG. 3 with a magnetic gap being G1 and a sectional view of enlarged portion A in FIG. 3 with a magnetic gap being G2.

As shown in FIG. 1, heating/stirring cooker 100 includes main body 1 in which an object to be cooked or the like is accommodated, and lid 5 that covers main body 1.

As shown in FIG. 2, container 2 is disposed inside main body 1. Container 2 is housed in container housing section 3 of main body 1.

Container 2 has an inner bottom part and an inner periphery, and has an opening at the top. The object to be cooked is accommodated and cooked in container 2. The inner bottom part and the inner periphery respectively constitute an inner peripheral surface and an inner bottom surface which are an inner surface of container 2.

Main body 1 has an inner wall and an outer wall, and has an opening at the top. Container housing section 3 is defined by the inner wall of main body 1.

As shown in FIG. 3, heater 4 serving as a heating unit is disposed on a bottom part of container housing section 3. Heater 4 is in contact with a lower surface of container 2 to transmit heat to container 2. Heater 4 has a ring shape in a plan view. Further, heater 4 is disposed to conform to the lower surface of container 2 when container 2 is housed in container housing section 3. Container 2 generates heat in response to heat from heater 4.

Lid 5 that covers the opening of main body 1 is disposed on main body 1. Lid 5 is mounted to main body 1 so as to be vertically rotatable with respect to main body 1.

Stirring body 6 is disposed in container 2. Stirring body 6 includes housing portion 9 and blade 10 provided around housing portion 9. Housing portion 9 houses inside magnet 7 composed of a permanent magnet, and clutch unit 8.

Stirring body 6 is disposed in container 2 so as to be detachable from the inner bottom part of container 2. Blade 10 rotates with the rotation of stirring body 6 to stir the object to be cooked in container 2.

As shown in FIG. 4, magnet 7 is disposed at a position facing the inner bottom part of container 2 in a state where stirring body 6 is disposed in container 2. Further, magnet 7 can receive a torque (rotational force) of a rotating magnetic field from an outside of housing portion 9.

Magnetic field generator 11 that generates a rotating magnetic field is disposed in main body 1.

Specifically, magnetic field generator 11 is located outside of the inner bottom part of container 2 so as to face magnet 7 of stirring body 6.

Magnetic field generator 11 has coupling portion 13, and motor 14 serving as a rotational driving unit. Motor 14 is connected to coupling portion 13.

Coupling portion 13 houses device-side magnet 12 composed of a permanent magnet. Device-side magnet 12 is disposed to face the magnetic field of magnet 7.

Note that device-side magnet 12 is housed in coupling portion 13 while being engaged with coupling portion 13 at an engagement portion of coupling portion 13. Therefore, when a driving force of motor 14 is transmitted to coupling portion 13, device-side magnet 12 rotates together with coupling portion 13. Thus, a rotating magnetic field is generated.

As shown in FIG. 3, controller 50 is disposed in main body 1.

Controller 50 controls the rotation of motor 14 to control the rotation of device-side magnet 12. Accordingly, the rotation (for example, direction of rotation, number of rotations, and rotation speed) of the rotating magnetic field is controlled.

Coupling portion 13 is disposed to penetrate a central opening formed in heater 4. Spacer member 15 is disposed between an upper end of coupling portion 13 and the lower surface of container 2. Spacer member 15 is attached to an upper part of coupling portion 13. The upper end of coupling portion 13 is located about 1 mm below the lower surface of container 2 by spacer member 15.

Note that interference portion 16 (see FIG. 2) protruding about 6 mm toward the center of container 2 and having a curved transverse section may be provided to a part of the inner periphery of container 2. Interference portion 16 can improve stirring performance for stirring the object to be cooked.

[2. Detailed Configuration of Stirring Body]

Next, the detailed configuration of stirring body 6 will be described.

Stirring body 6 has housing portion 9 (see FIG. 4). Magnet 7 and clutch unit 8 are housed in housing portion 9.

Figure 6A:
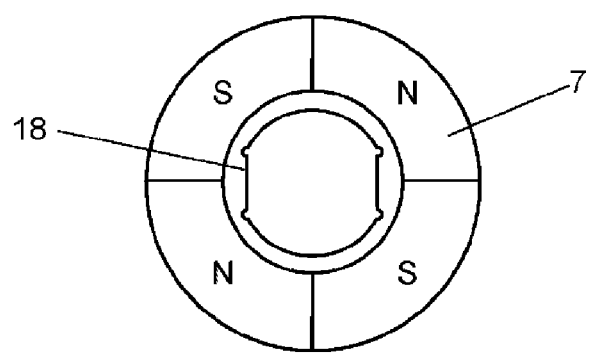
FIG. 6A is a bottom view showing a magnet of a stirring body in the exemplary embodiment of the present disclosure.
Figure 6B:
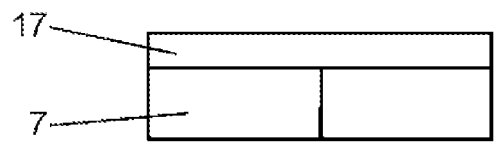
FIG. 6B is a side view showing the magnet of the stirring body in the exemplary embodiment of the present disclosure.
Figure 6C:
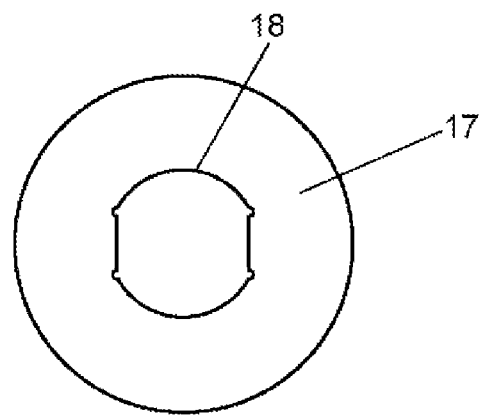
FIG. 6C is a plan view showing the magnet of the stirring body in the exemplary embodiment of the present disclosure.

FIGS. 6A to 6C are each a bottom view, a side view, and a plan view, which show the magnet of the stirring body in the exemplary embodiment.

As shown in FIG. 6A, magnet 7 is formed into a ring shape. Further, as shown in FIG. 6B, magnetic metal plate 17 is disposed above magnet 7. Magnetic metal plate 17 is bonded to magnet 7, for example. As shown in FIG. 6C, magnetic metal plate 17 has opening 18 in a central part. Magnetic metal plate 17 prevents an upward leakage of magnetic force of magnet 7 in a state where magnet 7 is housed in housing portion 9.

Specifically, magnetic metal plate 17 is disposed on an opposite side of magnet 7 from a side where a rotational force is externally applied.

Further, as shown in FIG. 6A, four magnetic poles are arranged on magnet 7 in the order of N/S/N/S.

Note that opening 18 may be formed to have at least one straight part at the outer edge of opening 18.

Figure 7A:
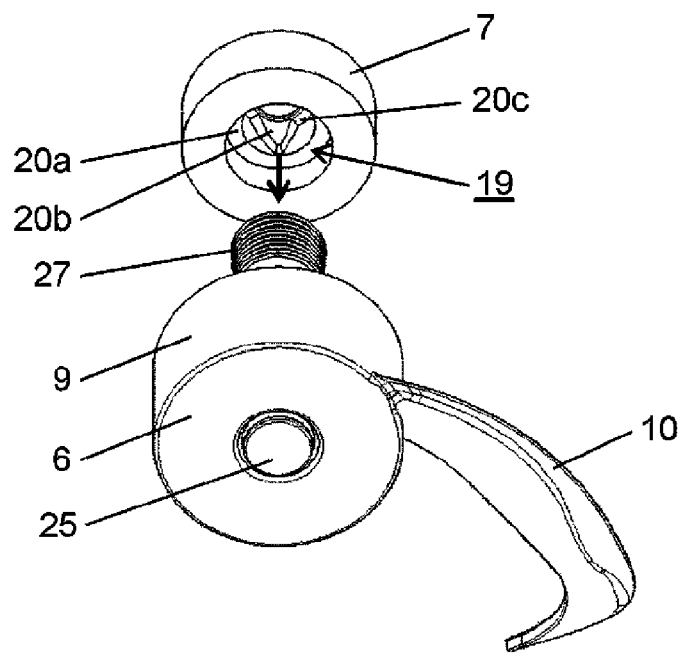
FIG. 7A is an exploded perspective view of the stirring body, as viewed from bottom, in the exemplary embodiment of the present disclosure.
Figure 7B:
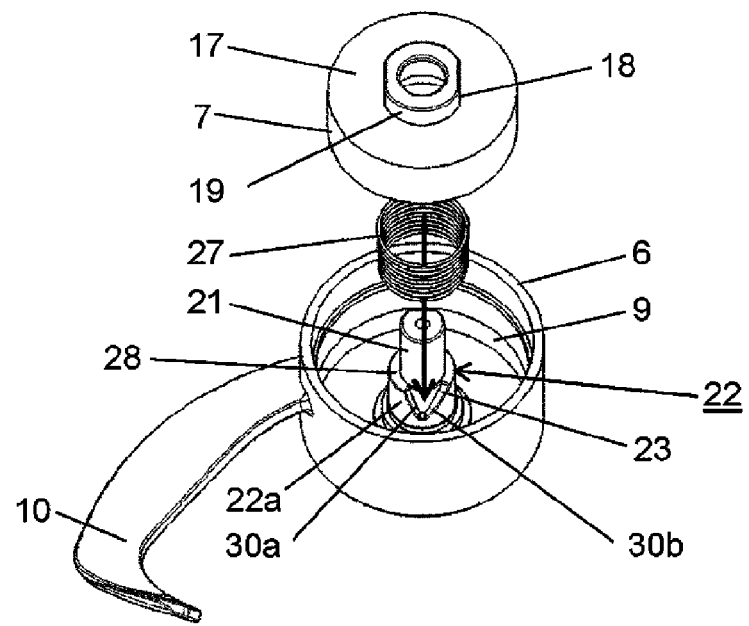
FIG. 7B is an exploded perspective view of the stirring body, as viewed from top, in the exemplary embodiment of the present disclosure.

FIGS. 7A and 7B are each an exploded perspective view of the stirring body as viewed from bottom in the exemplary embodiment and an exploded perspective view of the stirring body as viewed from top in the exemplary embodiment.

Clutch unit 8 (see FIG. 3) includes clutch claw portion 19, columnar portion 21, and clutch engagement portion 22 as shown in FIGS. 7A and 7B.

Clutch claw portion 19 includes substantially cylindrical base part 20a, and claw 20b and flat part 20c which are formed along an inner periphery of base part 20a so as to protrude from the inner periphery. Claw 20b has a projecting shape projecting from the inner periphery.

Base part 20a of clutch claw portion 19 is fitted in opening 18 of magnetic metal plate 17. Thus, clutch claw portion 19 rotates with the rotation of magnet 7.

Claw 20b has a substantially trapezoidal shape as viewed from the center side of base part 20a, wherein a lower base is shorter than an upper base. Thus, left and right side surfaces of claw 20b are inclined surfaces inclined from the lower base to the upper base.

Columnar portion 21 is disposed at a rotation center of housing portion 9. Columnar portion 21 penetrates through magnet 7 and clutch claw portion 19, whereby magnet 7 and clutch claw portion 19 are mounted to columnar portion 21. Thus, magnet 7 and clutch claw portion 19 are vertically movable with respect to columnar portion 21 and are rotatable about columnar portion 21. In other words, magnet 7 is housed in housing portion 9 so as to be movable in the height direction of columnar portion 21.

Clutch engagement portion 22 has base part 22a, engagement part 23, and slide part 28 formed by an upper end face of base part 22a. Clutch engagement portion 22 is disposed below clutch claw portion 19 so as to face clutch claw portion 19. Clutch engagement portion 22 has a substantially cylindrical shape, and disposed near the lower part of housing portion 9 in a state in which columnar portion 21 penetrates therethrough. Clutch engagement portion 22 is fixed to columnar portion 21.

Engagement part 23 is a recess formed by recessing a portion of base part 22a from top. An outer shape of engagement part 23 corresponds to an outer shape of claw 20b of clutch claw portion 19. Specifically, engagement part 23 is formed to have inclined surfaces corresponding to the left and right inclined surfaces of claw 20b. Engagement part 23 is slightly larger than claw 20b. Thus, claw 20b is securely fitted in engagement part 23.

Note that, as shown in FIG. 4, an upper part of columnar portion 21 is fixed to fixing portion 32 by means of a fastening member with magnet 7 and the like being housed in housing portion 9.

Further, a recess is formed in a lower part of columnar portion 21 at a rotation center part. Shaft unit 26 (see FIG. 4) is disposed in the recess of columnar portion 21. As shown in FIG. 4, shaft unit 26 includes shaft 26a, bushing 24, and receiving part 25 which is formed integrally with shaft 26a and has a substantially circular disk shape.

When stirring body 6 is disposed in container 2, receiving part 25 of shaft unit 26 is placed on the inner bottom part of container 2 while in contact with the inner bottom part. Blade 10 and housing portion 9 of stirring body 6 rotate about shaft unit 26 (see FIG. 3).

Note that the rotation of stirring body 6 is not transmitted to shaft 26a shown in FIG. 5 due to bushing 24. Therefore, receiving part 25 and shaft 26a remain fixed on the inner bottom part of container 2 while in contact therewith, and hardly rotate.

Further, as shown in FIGS. 8 to 11 described later, spring 27 composed of, for example, a compression coil is disposed below clutch claw portion 19 such that an upward pressing force is applied to clutch claw portion 19. Spring 27 is disposed between base part 20a of clutch claw portion 19 and the bottom surface of housing portion 9. Spring 27 biases magnet 7 toward a side opposite to a side where magnet 7 receives a rotational force of the rotating magnetic field.

FIG. 5 shows a state where clutch unit 8 is disengaged and the magnetic gap becomes G2. The state where clutch unit 8 is disengaged indicates a state where claw 20b of clutch claw portion 19 and engagement part 23 (see FIG. 8 described later) of clutch engagement portion 22 are not engaged with each other.

When clutch claw portion 19 is pushed up by spring 27, magnet 7 and magnetic metal plate 17 are pushed up to a position just below fixing portion 32 of housing portion 9 as shown in FIG. 5. A load (spring coefficient) of spring 27 is set such that, when the bottom surface of housing portion 9 of stirring body 6 is placed on a magnetic metal plate (for example, an iron plate) with this state, a force 1.2 to 1.5 times as high as an attractive force for attracting the bottom surface to the metal plate by a magnetic force of magnet 7 is applied to magnet 7.

Figure 10:
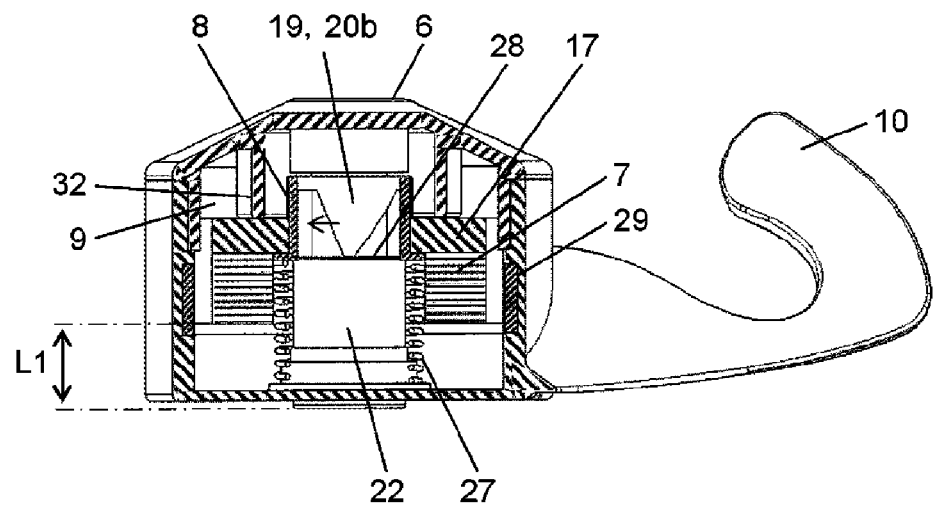
FIG. 10 is a sectional view showing a state in which the claw of the stirring body is disengaged from the engagement part and the magnet is elevated in the exemplary embodiment.

When magnet 7 and magnetic metal plate 17 are at a position just below fixing portion 32 in housing portion 9 as shown in FIG. 10 described later, the lower end of claw 20b moves while sliding on the surface of slide part 28, and rotates about shaft unit 26 (see FIG. 4). Note that slide part 28 is formed continuously with engagement part 23 (see FIG. 7B).

Further, as shown in FIGS. 4 and 5, magnetic metal body 29 is fixed on an inner wall of housing portion 9. Magnetic metal body 29 has a ring shape with shaft unit 26 of stirring body 6 being a center in a plan view.

Magnetic metal body 29 is disposed at a position outside of magnet 7 and facing the side surface of magnet 7 when magnet 7 is just below fixing portion 32 (see FIG. 5).

Magnetic metal body 29 may have a thickness of 1 mm to 3 mm.

A clearance of 0.5 mm to 3 mm is formed between magnetic metal body 29 and magnet 7. Therefore, contact of magnet 7 with magnetic metal body 29 during upward and downward movement and rotation of magnet 7 in housing portion 9 can be avoided.

On the other hand, when magnet 7 is located at the lower part of housing portion 9 as shown in FIG. 4, most of magnet 7 does not face magnetic metal body 29.

Figure 8:
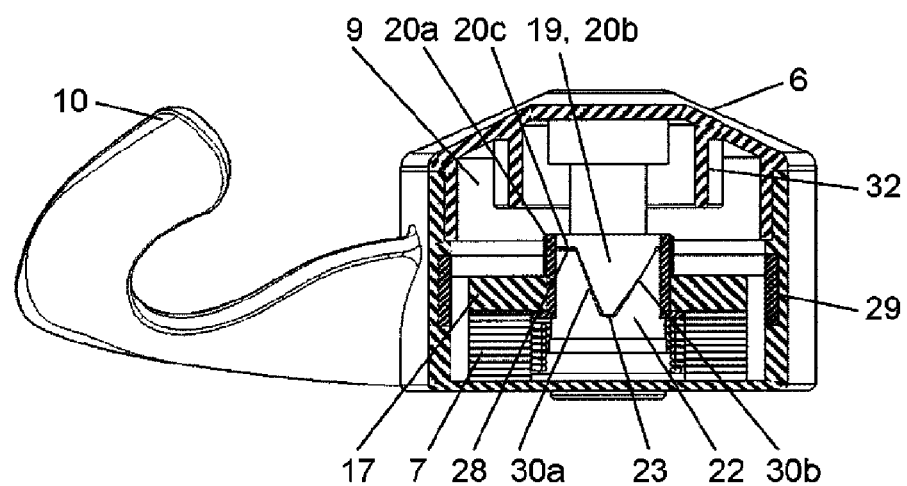
FIG. 8 is a sectional view showing a state in which a claw of the stirring body is engaged with an engagement part in the exemplary embodiment of the present disclosure.
Figure 9:
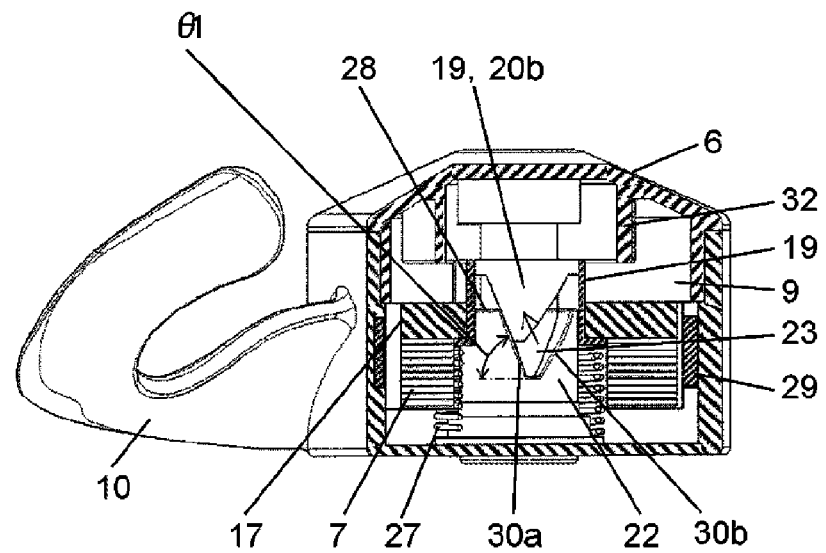
FIG. 9 is a sectional view showing a state in which the claw of the stirring body is moving up along an inclined surface of the engagement part in the exemplary embodiment of the present disclosure.
Figure 11:
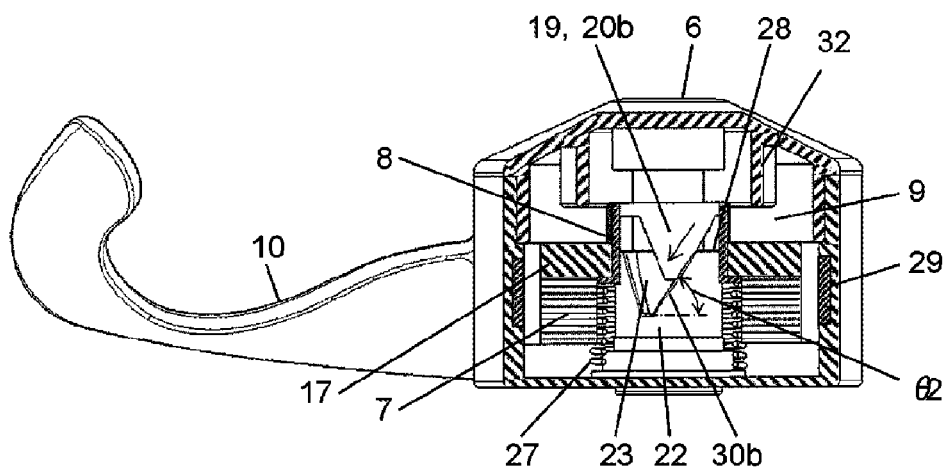
FIG. 11 is a sectional view showing a state in which the claw of the stirring body is moving down along the inclined surface of the engagement part in the exemplary embodiment.

FIG. 8 is a sectional view showing a state in which the claw of the stirring body is engaged with the engagement part in the exemplary embodiment. FIG. 9 is a sectional view showing a state in which the claw of the stirring body is moving up along the inclined surface of the engagement part in the exemplary embodiment. FIG. 10 is a sectional view showing a state in which the claw of the stirring body is disengaged from the engagement part and the magnet is elevated in the exemplary embodiment. In this case, claw 20b of stirring body 6 is placed on slide part 28. FIG. 11 is a sectional view showing a state in which the claw of the stirring body is moving down along the inclined surface of the engagement part in the exemplary embodiment.

In the state shown in FIG. 8, slide part 28 (see FIG. 9) holds flat part 20c of clutch claw portion 19 from below.

Engagement part 23 of clutch engagement portion 22 has left and right inclined surfaces 30a and 30b which are to be in contact with claw 20b of clutch claw portion 19. When stirring body 6 rotates in a forward (clockwise) rotation direction which is a main rotation direction, claw 20b is engaged with (in contact with) inclined surface 30a. Inclination angle θ1 (see FIG. 9) of inclined surface 30a is set to be 65° to 85° with respect to a rotation plane.

On the other hand, when stirring body 6 rotates in a reverse (counterclockwise) rotation direction, claw 20b is engaged with (in contact with) inclined surface 30b. Inclination angle θ2 (see FIG. 11) of inclined surface 30b is set to be 45° to 75° with respect to the rotation plane.

Any one of neodymium sintered magnet, samarium-cobalt magnet, Fe—Cr—Co magnet, and Fe—Nd—B bonded magnet is used as magnet 7 of stirring body 6. Meanwhile, a neodymium sintered magnet is used as device-side magnet 12 of magnetic field generator 11. Further, a material and size of magnet 7 are set such that magnetic characteristics, such as attractive force, become lower than magnetic characteristics of device-side magnet 12, in order that stirring body 6 is easy to be handled when being removed from container 2.

[3. Function of Stirring Body]

Next, a function of stirring body 6 will be described.

The rotational operation of device-side magnet 12 of magnetic field generator 11 is transmitted to magnet 7 of stirring body 6 via container 2 in a non-contact manner.

As shown in FIG. 6A, magnet 7 housed in stirring body 6 is formed into a ring shape with N poles and S poles being alternately arranged along a circumferential direction.

Device-side magnet 12 of coupling portion 13 is also formed to have N poles and S poles being alternately arranged along a circumferential direction at a position facing magnet 7.

With this configuration, when device-side magnet 12 rotates, a rotating magnetic field occurs. Therefore, a rotational force (torque) of the rotating magnetic field acts on magnet 7. Accordingly, magnet 7 rotates with the rotation of device-side magnet 12.

Specifically, when device-side magnet 12 rotates, magnet 7 rotates in synchronization with device-side magnet 12 due to an attractive force generated between opposite poles of magnets of magnet 7 and magnets of device-side magnet 12 facing each other, and a repulsive force generated between same poles of magnets of magnet 7 adjacent to the above-mentioned magnets and magnets of device-side magnet 12.

In FIG. 2, the rotation in clockwise direction R indicated by a solid arrow is a forward rotation direction of stirring body 6, and the rotation in counterclockwise direction L indicated by a dotted arrow is a reverse rotation direction of stirring body 6.

In the present exemplary embodiment, controller 50 controls magnetic field generator 11 so that the direction of rotation of the rotating magnetic field is switched between the forward rotation direction and the reverse rotation direction that is reverse to the forward rotation direction. The controller 50 causes the rotating magnetic field to make N rotations in the forward rotation direction and to make M rotations in the reverse rotation direction that is reverse to the forward rotation direction.

Controller 50 may be configured to cause the rotating magnetic field to make a set number of rotations which has been set in advance for the forward rotation direction and the reverse rotation direction. Controller 50 may also be configured to switch the direction of rotation of the rotating magnetic field when the rotating magnetic field makes the set number of rotations which has been set in advance for the forward rotation direction and the reverse rotation direction.

Then, controller 50 switches the direction of rotation of the rotating magnetic field to the reverse rotation direction, at least either when the rotating magnetic field makes the set number of rotations which has been set in advance for the forward rotation direction and the reverse rotation direction or when a change in the state of the rotating magnetic field of stirring body 6 is detected. Further, controller 50 causes the rotating magnetic field to make M rotations in the reverse rotation direction.

Note that controller 50 controls magnetic field generator 11 so that number M of rotations in the reverse rotation direction is less than number N of rotations in the forward rotation direction.

Accordingly, magnet 7 makes N rotations in the forward rotation direction, and blade 10 of stirring body 6 to which the rotational force is transmitted by clutch unit 8 makes N rotations in the forward rotation direction.

At least either when the rotating magnetic field makes the set number of rotations which has been set for the forward rotation direction and the reverse rotation direction or when a change in the state of the rotating magnetic field of stirring body 6 is detected, magnet 7 makes M rotations in the reverse rotation direction, and thus, blade 10 of stirring body 6 to which the rotational force is transmitted by clutch unit 8 makes M rotations in the reverse rotation direction.

Thus, the stirring body rotates in the reverse rotation direction as well as in the forward rotation direction so that an action different from an action applied by the rotation of the stirring body in the forward rotation direction is applied to the object to be cooked, whereby the rotational torque of stirring body 6 can also be exerted to the object to be cooked from a direction reverse to the forward rotation direction. Therefore, a factor that causes an increase in load applied to stirring body 6 due to the object to be cooked being unevenly distributed can be effectively eliminated, and stirring can be continued.

As shown in FIG. 2, blade 10 of stirring body 6 curves to project in the forward rotation direction in a plan view of blade 10. Therefore, when blade 10 rotates in the forward rotation direction, the objects to be cooked are gathered in container 2 from the center side toward the inner periphery side of container 2. Further, when blade 10 rotates in the reverse rotation direction, the objects to be cooked which have been gathered due to the rotation in the forward rotation direction are broken up toward the center side of container 2.

Accordingly, the objects to be cooked can be efficiently stirred, by which a mass of objects to be cooked which has caused an increase in rotational load can be broken up.

Upon switching the direction of rotation of the rotating magnetic field when the rotating magnetic field makes the set number of rotations which has been set in advance for the forward rotation direction and the reverse rotation direction, a ratio of number M of rotations in the reverse rotation direction to number N of rotations in the forward rotation direction may be set within a range from 0.1 to 0.9. Specifically, controller 50 may control magnetic field generator 11 such that a rate of the rotation of the rotating magnetic field in the forward rotation direction is larger than a rate of the rotation in the reverse rotation direction.

With this configuration, an increase in load can be reduced, and the objects to be cooked can be efficiently stirred.

Further, controller 50 may control magnetic field generator 11 such that number M of rotations in the reverse rotation direction is within a range from 1 to 2, upon switching the direction of rotation of the rotating magnetic field when the rotating magnetic field makes the set number of rotations which has been set in advance for the forward rotation direction and the reverse rotation direction.

With this configuration, controller 50 can cause stirring body 6 to make one or more rotations in the reverse rotation direction, by which a mass of the objects to be cooked which has stopped stirring body 6 can be broken up and distributed.

In the present exemplary embodiment, the number of rotations is set in advance for each of the forward rotation direction and the reverse rotation direction. For example, the number of rotation in the forward rotation direction is set to be 2.5 and the number of rotation in the reverse rotation direction is set to be 1.25 in advance. Specifically, controller 50 controls magnetic field generator 11 such that a ratio of number M of rotations in the reverse rotation direction to number N of rotations in the forward rotation direction becomes 0.5. Therefore, due to transmission of the rotational force from magnet 7, stirring body 6 makes 2.5 rotations in the forward rotation direction, and then, makes 1.25 rotations in the reverse rotation direction.

Due to the rotation of blade 10 in the reverse rotation direction, the objects to be cooked which have been gathered due to the rotation in the forward rotation direction are broken up (toward the center side of container 2). With this, an increase in load applied to heating/stirring cooker 100 can be reduced. Further, controller 50 controls such that the rate of rotation of blade 10 in the forward rotation direction is larger than the rate of rotation in the reverse rotation direction, whereby the objects to be cooked in container 2 can be efficiently stirred.

In addition, the ratio of number M of rotations in the reverse rotation direction to number N of rotations in the forward rotation direction is set such that the position of blade 10 upon switching the direction of rotation of stirring body 6 is different from the position of blade 10 upon previous switching of the direction of rotation. For example, numbers M and N of rotations are set to be a non-integer number. With this, blade 10 is located at different positions upon start of the rotation in the forward rotation direction or in the reverse rotation direction and upon switching the direction of rotation. Accordingly, the objects to be cooked can be uniformly stirred.

The stirring action of stirring body 6 for stirring the objects to be cooked will be described in detail. When stirring body 6 shown in FIG. 2 rotates in the forward rotation direction, blade 10 pushes out the objects to be cooked from the center side to the inner periphery side in container 2. During this process, the objects to be cooked receive resistance from the inner wall surface of container 2 or interference portion 16, thereby climbing over blade 10. Specifically, blade 10 pushes out the objects to be cooked, and further, turns over the objects to be cooked. Therefore, due to stirring body 6 being rotated alternately in the forward rotation direction and in the reverse rotation direction, the objects to be cooked can be distributed and gathered in container 2. Further, the objects to be cooked can be turned over, whereby the objects to be cooked can be stirred while being entirely heated with heat from heater 4 from the bottom surface of container 2.

In the present exemplary embodiment, when the objects to be cooked mainly including solids are stirred, the rotation speed of stirring body 6 may be set to be low such as 2 to 20 rotations per minute.

When a large torque which may stop the rotation of blade 10 in the forward rotation direction is applied to blade 10 or when blade 10 stops due to an excess load, blade 10 is rotated in the reverse rotation direction, whereby stirring can be continued. Specifically, when blade 10 is rotated in the reverse rotation direction, the objects to be cooked which cause an increase in load applied to blade 10 can be removed from blade 10. Accordingly, a situation in which the objects to be cooked are heated while not being sufficiently stirred can be avoided, and thus, an occurrence of uneven heating and scorching of the objects to be cooked can be prevented.

When the ratio of the number of rotations of blade 10 in the reverse rotation direction to the number of rotations in the forward rotation direction is set to be less than or equal to 0.1, the effect of reducing the increase in load is low. Further, if it takes time to remove the factor that causes an increase in load while the rotation of blade 10 in the forward rotation direction is low or the rotation is stopped due to application of an excess load to blade 10, the objects to be cooked may be partially strongly heated, which may cause scorching of the objects to be cooked. In view of this, in the present exemplary embodiment, the ratio of the number of rotations of blade 10 in the reverse rotation direction to the number of rotations in the forward rotation direction is set to be 0.5 so as to quickly and reliably remove the factor that causes an increase in load.

Further, as described above, heating/stirring cooker 100 according to the present exemplary embodiment has a clutch mechanism inside stirring body 6. The clutch mechanism will be described below.

The objects to be cooked are stirred with heating/stirring cooker 100 with a state in which a rotational force of the rotating magnetic field generated from magnetic field generator 11 is exerted on magnet 7 and the rotation of magnet 7 is transmitted to housing portion 9 via clutch unit 8.

FIGS. 4 and 8 show a state where clutch unit 8 is engaged, that is, a state where claw 20b of clutch claw portion 19 and engagement part 23 of clutch engagement portion 22 are engaged with each other (see FIG. 8) to transmit the rotation of magnet 7 to housing portion 9 and blade 10 connected to housing portion 9.

As shown in FIG. 8, claw 20b of clutch claw portion 19 and engagement part 23 of clutch engagement portion 22 are engaged with each other in housing portion 9 of stirring body 6. In this state, magnet 7 moves down to the bottom part of housing portion 9. Specifically, the magnetic gap between magnet 7 and device-side magnet 12 of magnetic field generator 11 becomes G1 (see FIG. 4) which is the shortest.

Therefore, in this state, the magnetic attractive force between magnet 7 and device-side magnet 12 is the maximum. Further, spring 27 is compressed, and therefore, a pressing force from spring 27 to the magnet increases.

However, because the magnetic attractive force between magnet 7 and device-side magnet 12 is much stronger, a decrease in the rotational force applied to magnet 7 is small.

Notably, in the present exemplary embodiment, when the magnetic gap between magnet 7 and device-side magnet 12 of magnetic field generator 11 is G1, the magnetic attractive force generated between magnet 7 and device-side magnet 12 is about 4.0 Kgf.

In FIGS. 4 and 8, magnet 7 rotates in response to the rotational force of the rotating magnetic field generated by the rotation of device-side magnet 12. Accordingly, magnet 7 rotates in synchronization with device-side magnet 12.

Further, as shown in FIG. 8, claw 20b of clutch claw portion 19 and engagement part 23 of clutch engagement portion 22 are engaged with each other in housing portion 9 of stirring body 6. Therefore, the rotation of magnet 7 is transmitted to engagement part 23 of clutch engagement portion 22 via claw 20b of clutch claw portion 19.

In addition, the rotational force of magnet 7 is applied to engagement part 23, whereby housing portion 9 integral with engagement part 23 rotates about shaft 26a. Along with housing portion 9, blade 10 formed on an external side surface of housing portion 9 rotates, whereby stirring body 6 rotates.

[4. Removal of Stirring Body]

Next, a method for removing stirring body 6 will be described.

After finishing cooking with heating/stirring cooker 100, the user can remove stirring body 6 from the inside of container 2. In the present exemplary embodiment, the user can remove stirring body 6 from the inside of container 2 by turning blade 10 in the clockwise direction.

After the cooking is finished, motor 14 is stopped, and thus, coupling portion 13 of magnetic field generator 11 stops and stands still on the spot. In this state, when the user turns blade 10 in the clockwise direction as shown in FIG. 2, magnet 7 inside of stirring body 6 attempts to stay on the spot due to the attractive force of device-side magnet 12 in coupling portion 13.

Therefore, as in the case in FIG. 9, a pressing force in the clockwise direction by claw 20b of clutch claw portion 19 is exerted on engagement part 23 of clutch engagement portion 22. Accordingly, claw 20b moves up along inclined surface 30a of engagement part 23. When claw 20b further rotates in the clockwise direction, the lower end of claw 20b reaches slide part 28 and the lower end of claw 20b stays on slide part 28, as shown in FIG. 10.

Further, in this case, magnet 7 rotates only a little in the clockwise direction due to the pressing force in the direction of rotation of clutch claw portion 19. With this, an area where the same poles of magnet 7 and device-side magnet 12 face each other is generated, so that a repulsive force is generated between magnet 7 and device-side magnet 12. Accordingly, the repulsive force also acts in the direction in which magnet 7 moves up in housing portion 9.

In the state shown in FIG. 10, clutch unit 8 is disengaged, that is, claw 20b of clutch claw portion 19 and engagement part 23 of clutch engagement portion 22 are not engaged with each other. Therefore, the rotational force of the rotating magnetic field generated from magnetic field generator 11 is not transmitted to housing portion 9. Thus, even when magnet 7 rotates, the rotation of magnet 7 is not transmitted to engagement part 23 of clutch engagement portion 22 via claw 20b of clutch claw portion 19.

When magnet 7 moves to the position shown in FIG. 10, the magnetic gap between magnet 7 and device-side magnet 12 increases to G2 from G1 which is a magnetic gap between both magnets during stirring shown in FIG. 4 (see FIG. 5). The increase in the magnetic gap corresponds to the depth (height of claw 20b) of the recess in engagement part 23 of clutch engagement portion 22 shown in FIG. 8. In the present exemplary embodiment, the depth of the recess in engagement part 23 is set to be about 10 mm.

When the magnetic gap increases from G1 to G2, the attractive force between magnet 7 and device-side magnet 12 drops to about 1.0 Kgf from about 4.0 Kgf described above. In other words, the attractive force between both magnets decreases by about 75%. Therefore, a load to remove stirring body 6 is significantly reduced, whereby the user can easily remove stirring body 6 from the inside of container 2.

In stirring body 6 removed from the inside of container 2, magnet 7 and magnetic metal plate 17 are held just below fixing portion 32 in housing portion 9 as shown in FIG. 10. Therefore, there is spatial distance L1 which is a total of the thickness of stirring body 6 at a bottom part and an engagement height of clutch unit 8 between the magnetic surface of magnet 7 and the lower surface of stirring body 6. Due to the presence of spatial distance L1, the magnetic force on the lower surface of stirring body 6 is low.

Therefore, even when stirring body 6 is placed on a magnetic metal kitchen sink, for example, magnet 7 and a metal surface of the kitchen sink hardly attract each other.

The same applies to metal tableware or kitchen utensils formed from magnetic metal, such as forks and knives. That is, accidental attraction of forks, knives, or the like to stirring body 6 due to the magnetic force from magnet 7 of stirring body 6 can be prevented.

When stirring body 6 is removed from container 2, claw 20b of clutch claw portion 19 stays on slide part 28 of clutch engagement portion 22 in stirring body 6. Therefore, even when a strong impact is applied to stirring body 6, claw 20b is unlikely to drop down. That is, a downward movement of magnet 7 is avoided. Accordingly, a situation in which the attractive force of magnet 7 on the lower surface of housing portion 9 becomes strong again can be avoided.

The magnetic characteristics of magnet 7 in stirring body 6 in the present exemplary embodiment are set such that, if magnet 7 is fixed to a lower part of housing portion 9, an attractive force for attracting a magnetic metal plate or the like is about 3.5 Kgf. On the other hand, when magnet 7 moves up due to the action of clutch unit 8 as described above, the attractive force of magnet 7 on the lower surface of housing portion 9 drops to about 100 gf to 300 gf.

As described above, magnetic metal plate 17 is attached to the surface of magnet 7 close to fixing portion 32 shown in FIG. 4. Therefore, a magnetic flux directed upward from magnet 7 is concentrated in magnetic metal plate 17. With this, even when magnet 7 is located at an upper part in stirring body 6, the magnetic field hardly passes to an area above stirring body 6. Accordingly, attraction of metal spoons or the like to the upper surface of stirring body 6 can be avoided.

In stirring body 6 in the present exemplary embodiment, ring-shaped magnetic metal body 29 in a plan view is disposed to face the external side surface of magnet 7 when magnet 7 is positioned just below fixing portion 32 (see FIG. 10). Magnetic metal body 29 is mounted on an outer periphery of housing portion 9.

With this configuration, flow of magnetic force directed toward the outside of the side surface from magnet 7 is concentrated in the thickness of magnetic metal body 29. Therefore, the magnetic field hardly passes to the outside of the side surface of stirring body 6. Accordingly, attraction of metal objects to the side surface of stirring body 6 can be avoided.

In the present exemplary embodiment, magnetic metal body 29 is provided at a position facing magnet 7 when magnet 7 is elevated. However, the configuration of magnetic metal body 29 is not limited thereto. Magnetic metal body 29 may be provided on the entire side surface of housing portion 9 in the height direction.

Further, the installment position, size, and shape of magnetic metal body 29 can be set, as appropriate, according to a stirring torque.

In addition, magnetic metal body 29 may be attached to the side surface of magnet 7.

Further, the bottom surface part of housing portion 9 in stirring body 6 may be formed from non-metal or non-magnetic metal, and the side surface part of housing portion 9 and fixing portion 32 may be formed from magnetic metal. In this configuration, non-metal or non-magnetic metal and magnetic metal are joined to each other by a joining method for joining different types of materials.

According to the configuration described above, passage of magnetic flux to the upper side and to the side of housing portion 9 can be prevented.

Further, in the present exemplary embodiment, spring 27 is provided between clutch claw portion 19 and the bottom surface of housing portion 9 as described above. With this configuration, even when the user forcibly removes stirring body 6 without rotating clutch unit 8 after finishing cooking, magnet 7 and magnetic metal plate 17 are pushed up by spring 27 to a position just below fixing portion 32. Further, spring 27 is set such that a pressing force larger than the attractive force generated when a magnetic metal plate or the like is attracted to the lower surface of housing portion 9 is applied to magnet 7 in a state where magnet 7 and magnetic metal plate 17 are located just below fixing portion 32. Therefore, even if only a little impact is applied to stirring body 6 when, for example, the user drops stirring body 6, magnet 7 does not move down in housing portion 9.

To set stirring body 6 to the inner bottom part of container 2, the user turns blade 10 in the clockwise direction with the lower surface of housing portion 9 of stirring body 6 being brought into contact with the inner bottom part of container 2. With this process, opposite poles of magnet 7 and device-side magnet 12 face each other and attract each other. In this case, the magnetic gap between magnet 7 and device-side magnet 12 is G2 (see FIG. 5). When the user further turns blade 10 in the clockwise direction with this state, claw 20b staying on slide part 28 slides on slide part 28 to the left in FIG. 11. When claw 20b is about to reach inclined surface 30b of clutch engagement portion 22, claw 20b slides down along inclined surface 30b (see FIG. 11). Thus, magnet 7 is located on the lower part (bottom side) of housing portion 9 (see FIG. 8).

In the state where the magnetic gap is G2 upon setting stirring body 6 to container 2 as shown in FIG. 5, the attractive force due to the magnetic field between magnet 7 and magnetic field generator 11 is larger than the pressing force of spring 27. As magnet 7 moves down to the lower part (bottom side) of housing portion 9, the pressing force of spring 27 increases; however, an increase in the attractive force between the magnets is larger than the increase in the pressing force. Therefore, magnet 7 reliably moves down to the lower part (bottom side) of housing portion 9. With this, stirring body 6 is properly set into container 2, whereby a stirring torque set for heating/stirring cooker 100 can be reliably generated.

[5. Operation of Clutch Unit During Cooking]

Next, the operation of clutch unit 8 during stirring/cooking will be described.

During stirring of objects to be cooked, the objects to be cooked may get stuck between blade 10 of stirring body 6 and the inner periphery of container 2 shown in FIG. 3, depending on a kind of objects to be cooked (for example, meat, potatoes, onions, beans, etc.), the size of the objects to be cooked, a chopped state of the objects to be cooked (for example, a finely chopped state or a roughly chopped state), an amount of the objects to be cooked, or other conditions. If such a situation occurs, an excess load is applied to stirring body 6.

Interference portion 16 (see FIG. 2) in the present exemplary embodiment improves stirring characteristics. Meanwhile, the objects to be cooked are likely to get stuck between interference portion 16 and the tip of blade 10 of stirring body 6.

If no measure is taken to address such a problem, the following may occur.

While the excess load described above is applied to stirring body 6 shown in FIG. 3 and the rotation of stirring body 6 slows down or stops, device-side magnet 12 in magnetic field generator 11 still continuously rotates at a set speed. Therefore, a rotational deviation angle increases between magnet 7 and device-side magnet 12. Specifically, magnet 7 and device-side magnet 12 which attract each other because of opposite poles facing each other are turned into a state where the same poles face each other, and thus, a repulsive force is generated between magnet 7 and device-side magnet 12. With this, stirring body 6 is pushed up and is offset from the rotation center, that is, stirring body 6 deviates.

Once deviating, stirring body 6 is hard to return to the position of the rotation center because of the objects to be cooked being a barrier. Accordingly, the stirring function is suspended.

If the heating is continued with the stirring operation being suspended, the objects to be cooked are heated while being unevenly distributed, resulting in that uneven heating or partial scorching may occur.

On the other hand, the above-mentioned situation can be avoided with clutch unit 8 in the present exemplary embodiment.

In the present exemplary embodiment, when an excess load is applied to stirring body 6, the rotation of blade 10 and housing portion 9 of stirring body 6 slows down or they stand still (stop) on the spot. On the other hand, magnet 7 attempts to rotate while being attracted by the magnetic field from magnetic field generator 11.

Therefore, claw 20b of clutch claw portion 19 slides up inclined surface 30a of engagement part 23 (see FIG. 9), and subsequently, the lower end of claw 20b gets on slide part 28 of clutch engagement portion 22 (see FIG. 10).

While claw 20b slides on slide part 28, clutch unit 8 does not transmit the rotational force of the rotating magnetic field from magnetic field generator 11 to housing portion 9 via magnet 7. This is due to disengagement between claw 20b and engagement part 23. Thus, the rotational force of magnet 7 is not transmitted to housing portion 9 via claw 20b even when magnet 7 rotates. Therefore, blade 10 and housing portion 9 of stirring body 6 stand still (stop) on the spot.

Meanwhile, magnet 7 and device-side magnet 12 keep attracting each other, whereby magnet 7 rotates with the rotation of device-side magnet 12. Therefore, stirring body 6 is unlikely to be offset from the rotation center. Specifically, deviation of stirring body 6 from the rotation center can be avoided.

When claw 20b slides and moves on slide part 28 and is just about to reach the position of engagement part 23 with device-side magnet 12 and magnet 7 still attracting each other, claw 20b slides down along inclined surface 30b and is engaged with engagement part 23 of clutch engagement portion 22 as shown in FIG. 11.

Specifically, in the state where an excess load is applied to stirring body 6, magnet 7 turns free with blade 10 and housing portion 9 of stirring body 6 standing still on the spot. Therefore, upward movement of stirring body 6 due to the repulsive force between device-side magnet 12 and magnet 7 can be avoided. Thus, stirring body 6 stays in place without deviating from the rotation center. Accordingly, the stirring operation can be reliably continued in combination with the rotation of stirring body 6 in the reverse rotation direction.

In the present exemplary embodiment, in clutch unit 8, the inclination angle of inclined surface 30a of engagement part 23 located in the forward rotation direction which is a main rotation direction is set to be 65° to 85°. With this setting, a frequency of operation of the clutch unit can be reduced, and a decrease from a stirring torque that would be generated when clutch unit 8 is not provided is limited to 10% or lower.

Further, the inclination angle of inclined surface 30b of engagement part 23 located in the reverse rotation direction is set to be 45° to 75°. With this setting, claw 20b gradually moves down along inclined surface 30b. The configuration described above can prevent generation of an impact sound or damage of magnet 7 on impact due to rapid drop of magnet 7 by a strong attractive force from magnetic field generator 11.

When the magnetic gap between magnet 7 and device-side magnet 12 widens due to the action of clutch unit 8, a magnetic coupling force between the magnets varies. In other words, when the attractive force between magnet 7 and device-side magnet 12 weakens, flow of magnetic force between the magnets varies.

Specifically, when the magnetic gap between magnet 7 and device-side magnet 12 widens, a range where the magnetic force of magnet 7 and device-side magnet 12 exists extend outward in the diameter direction of magnet 7 and in the diameter direction of device-side magnet 12, respectively. In view of this, if detector 33 for detecting the magnetic force is appropriately disposed at the outside of magnet 7 or device-side magnet 12 in the radial direction, it is possible to determine that clutch unit 8 of stirring body 6 is operated and disengaged, that is, determine that a load is applied to stirring body 6.

[6. Detector]

Detector 33 will be described below in detail.

Figure 12:
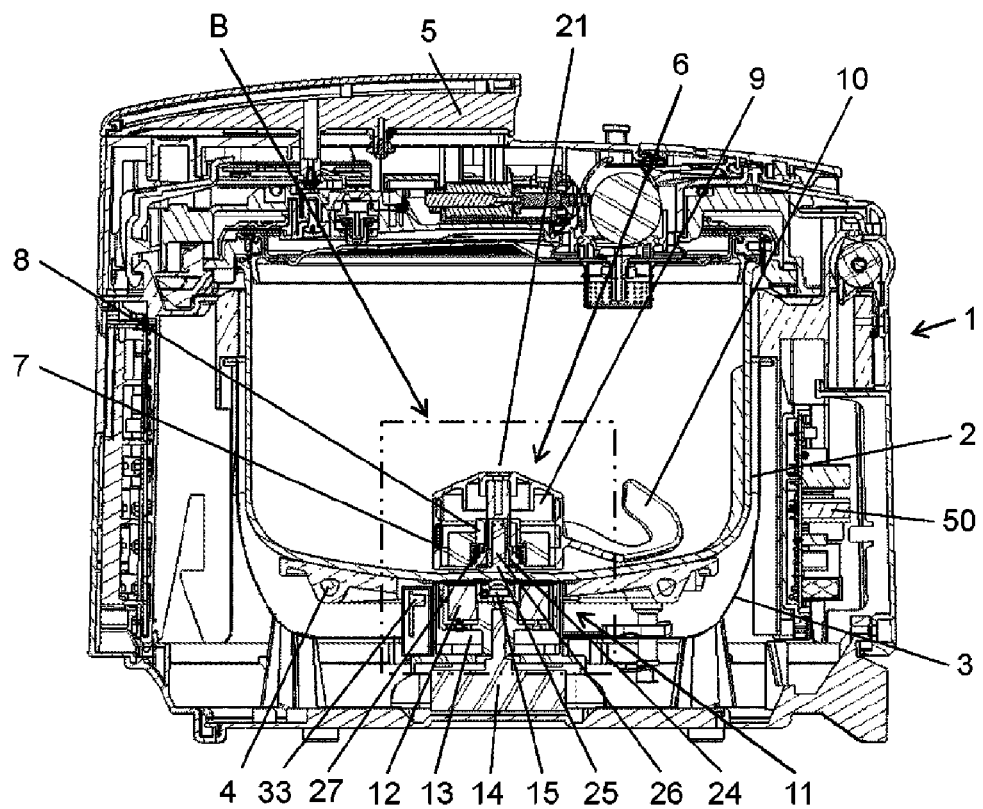
FIG. 12 is a sectional view along line III-III in FIG. 2 in a configuration provided with a detector.
Figure 13:
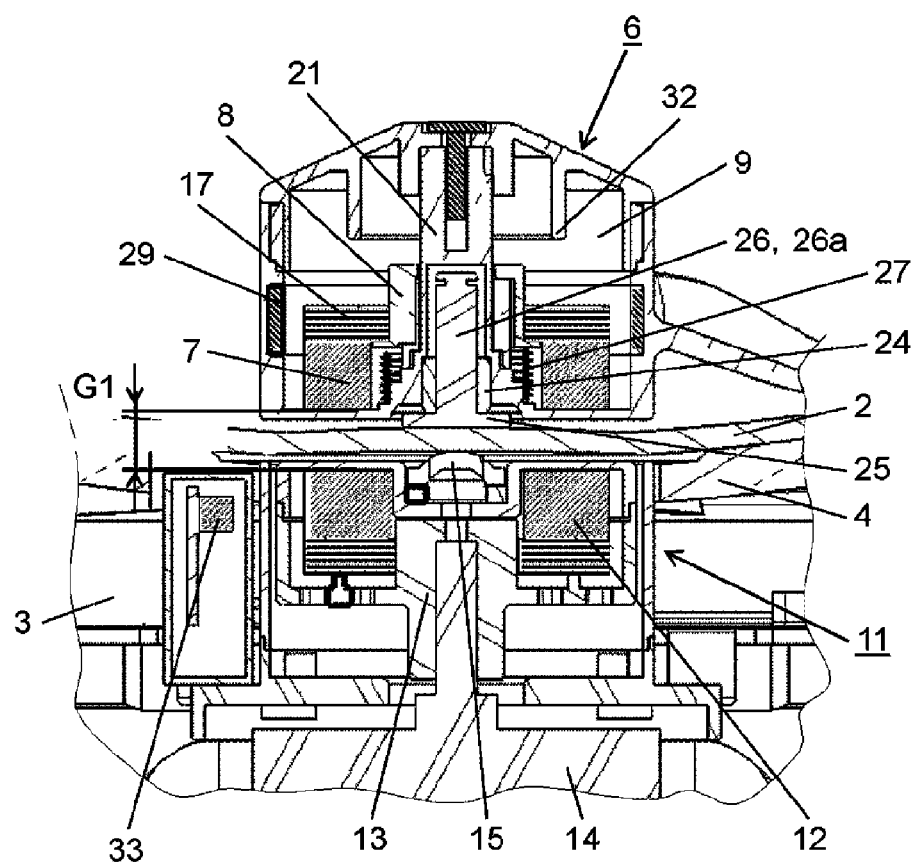
FIG. 13 is a sectional view of enlarged portion B in FIG. 12 with a magnetic gap being G1.
Figure 14:
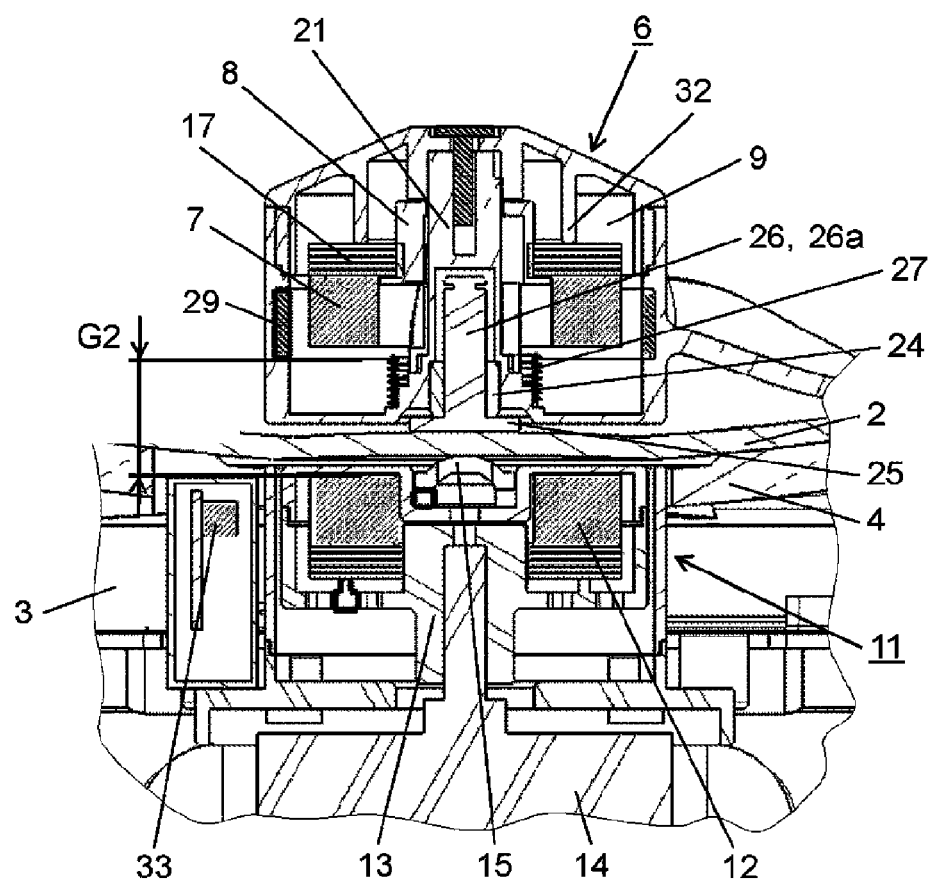
FIG. 14 is a sectional view of enlarged portion B in FIG. 12 with a magnetic gap being G2.

FIG. 12 is a sectional view along line III-III in FIG. 2 in a configuration provided with the detector. FIGS. 13 and 14 are each a sectional view of enlarged portion B in FIG. 12 with a magnetic gap being G1 and a sectional view of enlarged portion B in FIG. 12 with a magnetic gap being G2.

As shown in FIGS. 12 to 14, detector 33 is provided in main body 1 (see FIG. 12) near device-side magnet 12. Detector 33 is composed of a magnetic sensor which is a Hall element or a magnetoresistance element, and detects a change in the state of the rotating magnetic field. Detector 33 detects, for example, magnetic coupling between magnet 7 of stirring body 6 and device-side magnet 12 in magnetic field generator 11, thereby detecting a change in the state of the rotating magnetic field. In this way, detector 33 detects a change in the rotating state of stirring body 6. Detector 33 detects, for example, a change in the flow of magnetic force between magnet 7 and device-side magnet 12, thereby detecting magnetic coupling.

Note that detector 33 may be provided outside of device-side magnet 12 in the radial direction with respect to the rotation center of device-side magnet 12 so as to face device-side magnet 12. A change in flow of magnetic force at the outside of device-side magnet 12 may be detected by detector 33 disposed as described above.

Thus, detector 33 can detect a coupling state between the magnets with a magnetism conversion element such as a magnetic sensor, whereby a complex structure which leads to an increase in size of devices can be avoided.

Detector 33 may be a mechanical detector formed by combining a magnetic body with a switching element, such as a microswitch provided with an on-off lever formed from a magnetic body.

Next, a difference in a change in flow of magnetic force between a period during stirring in which clutch unit 8 is engaged and a period during the clutch operation in which clutch 8 is disengaged will be described with reference to FIGS. 15 and 16.

Figure 15:
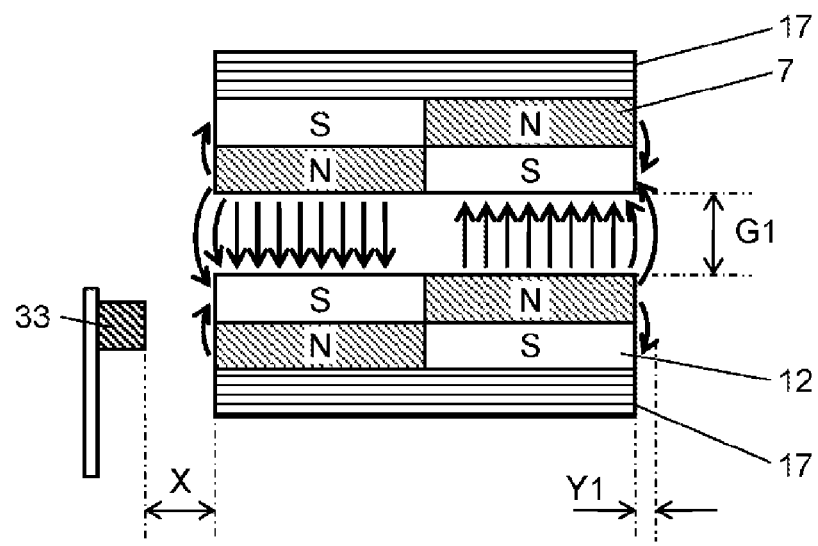
FIG. 15 is a sectional view showing flow of magnetic force in magnetic coupling with the magnetic gap being G1.

FIG. 15 is a sectional view showing flow of magnetic force in magnetic coupling with the magnetic gap being G1. FIG. 15 shows a state where stirring body 6 is set into container 2. FIG. 16 is a sectional view showing flow of magnetic force in magnetic coupling with the magnetic gap being G2 in the configuration provided with the clutch unit. FIG. 16 shows a state where the magnetic gap between magnet 7 and device-side magnet 12 widens due to the operation of clutch unit 8.

FIG. 15 shows the state where, due to the clutch being engaged, the objects to be cooked can be stirred. Specifically, a strong attractive force acts between magnet 7 and device-side magnet 12, with the result that both magnets are strongly magnetically coupled. In this case, the flow of magnetic force between the magnets is concentrated between the magnetically-coupled surfaces as indicated by arrows in FIG. 15. A range (radial distance Y) where the flow of magnetic force exists at the outside of device-side magnet 12 in the radial direction is indicated as Y1, and is limited near the radially external side surfaces of magnet 7 and device-side magnet 12.

In the present exemplary embodiment, distance X between detector 33 and the radially external side surface of device-side magnet 12 is set to satisfy X>Y1. Therefore, in the state shown in FIG. 15, detector 33 does not detect magnetic force. Even if detector 33 detects magnetic force, an amount of the detected magnetic force is very small.

Figure 16:
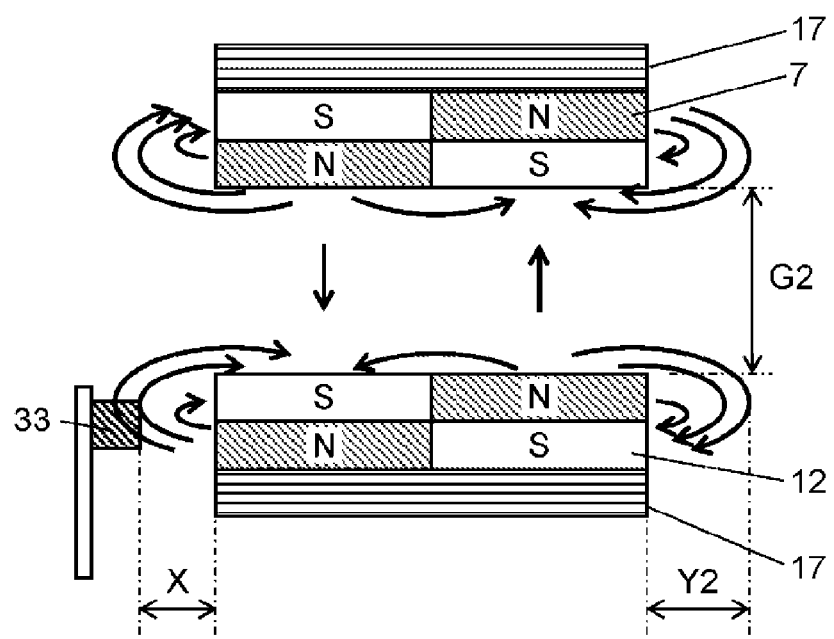
FIG. 16 is a sectional view showing flow of magnetic force in magnetic coupling with the magnetic gap being G2 in a configuration provided with a clutch unit.

When clutch unit 8 is operated, that is, clutch unit 8 is disengaged, the magnetic gap between magnet 7 and device-side magnet 12 increases to G2 as shown in FIG. 16. In other words, the magnetic coupling between magnet 7 and device-side magnet 12 weakens. In this case, the flow of magnetic force between magnet 7 and device-side magnet 12 decreases. On the other hand, in magnet 7 and device-side magnet 12, the flow of magnetic force increases between opposite poles of the adjacent magnets or between opposite poles of each magnet.

Therefore, a range (radial distance Y) where the flow of magnetic force exists at the outside of device-side magnet 12 in the radial direction is indicated as Y2 larger than Y1 as shown in FIG. 16. In this case, distance X is set to satisfy Y1<X<Y2, whereby detector 33 can detect magnetic force. Specifically, detector 33 can detect a change in the flow of magnetic force between magnet 7 and device-side magnet 12.

In this way, detector 33 can detect a change in the range where the flow of magnetic force exists at the outside of device-side magnet 12 in the radial direction, thereby being capable of determining whether clutch unit 8 is operated or not. In other words, detector 33 can detect that stirring body 6 stops rotating.

Upon switching the direction of rotation of the rotating magnetic field when the rotating magnetic field makes the set number of rotations which has been set in advance for the forward rotation direction and the reverse rotation direction, number M of rotations may be within a range from 1 to 2.

Specifically, when detector 33 detects a change in the flow of magnetic force, controller 50 outputs, to magnetic field generator 11, a signal for switching the direction of rotation of the rotating magnetic field to the reverse rotation direction. Accordingly, controller 50 causes stirring body 6 to make one to two rotations in the reverse direction via device-side magnet 12 and magnet 7. Thereafter, controller 50 controls magnetic field generator 11 such that the normal stirring operation is performed, that is, the rotating magnetic field makes N rotations in the forward rotation direction and M rotations in the reverse rotation direction.

In the present exemplary embodiment, when detector 33 detects a change in the flow of magnetic force, stirring body 6 is set to make one to two rotations in the reverse direction. With this configuration, the objects to be cooked which cause stirring body 6 to stop can be broken up or distributed. Further, due to one or more rotations in the reverse direction, stirring body 6 can be prevented from stopping again due to the objects to be cooked just after the normal stirring operation is started.

The present exemplary embodiment shows stirring body 6 provided with clutch unit 8. However, in a configuration in which clutch unit 8 is not provided, a situation where stirring body 6 stops due to a load being applied thereto can also be detected. In the configuration in which clutch unit 8 is not provided, a change in flow of magnetic force occurs between device-side magnet 12 and magnet 7, and through detection of such a change, deviation of stirring body 6 can be avoided.

Figure 17:
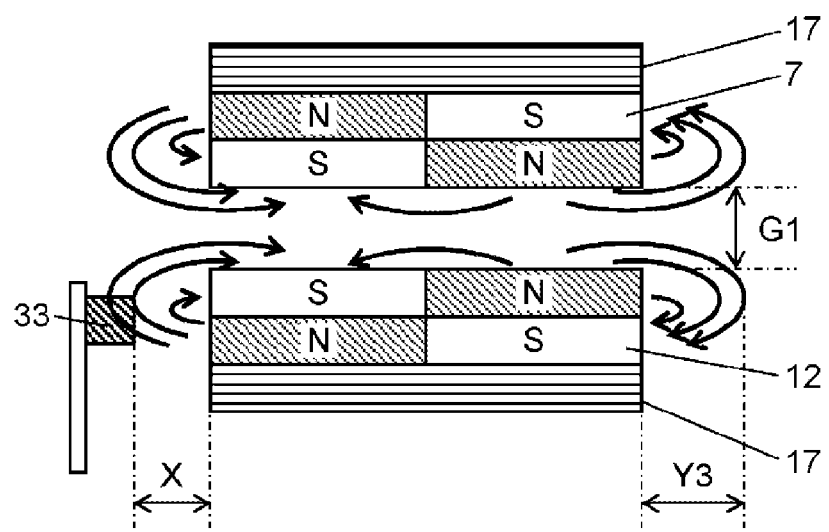
FIG. 17 is a sectional view showing flow of magnetic force in magnetic coupling when a repulsive force is generated between magnets in a configuration where the clutch unit is not provided.

FIG. 17 is a sectional view showing flow of magnetic force in magnetic coupling when a repulsive force is generated between magnets in the configuration where the clutch unit is not provided. FIG. 17 shows a state where magnet 7 stops rotating and the same poles of magnet 7 and device-side magnet 12 face each other. Magnet 7 stops rotating due to application of a load to stirring body 6, while device-side magnet 12 continuously rotates. Therefore, there is a timing at which the same poles face each other as described above. In the configuration shown in FIG. 17, clutch unit 8 is not provided. Therefore, the magnetic gap between magnet 7 and device-side magnet 12 is constantly G1 as in FIG. 15.

In the state shown in FIG. 17, a repulsive force is generated between magnet 7 and device-side magnet 12, and therefore, there is no flow of magnetic force directed to the respective magnets between magnet 7 and device-side magnet 12. On the other hand, in magnet 7 and device-side magnet 12, flow of magnetic forces increases between opposite poles of adjacent magnets or between opposite poles of each magnet.

In such a magnetic coupling state, a range (radial distance Y) where the flow of magnetic force exists at the outside of device-side magnet 12 in the radial direction is indicated as Y3, and Y1<Y3 is established. In this case, detector 33 is disposed to satisfy Y1<X<Y3. Thus, detector 33 can detect a change in the flow of magnetic force in the magnetic coupling between magnet 7 and device-side magnet 12.

With the configuration described above, a situation where stirring body 6 stops because of objects to be cooked getting stuck in stirring body 6 can be determined with detector 33, even when clutch unit 8 is not provided.

Generally, in a non-contact rotation transmission mechanism using magnetic coupling between magnets which face each other, rotational torque (T) increases with an increase in deviation of magnetic poles between the magnets, that is, with an increase in a rotational deviation angle. When the rotational torque exceeds the maximum value, loss of synchronization occurs.

Figure 18:
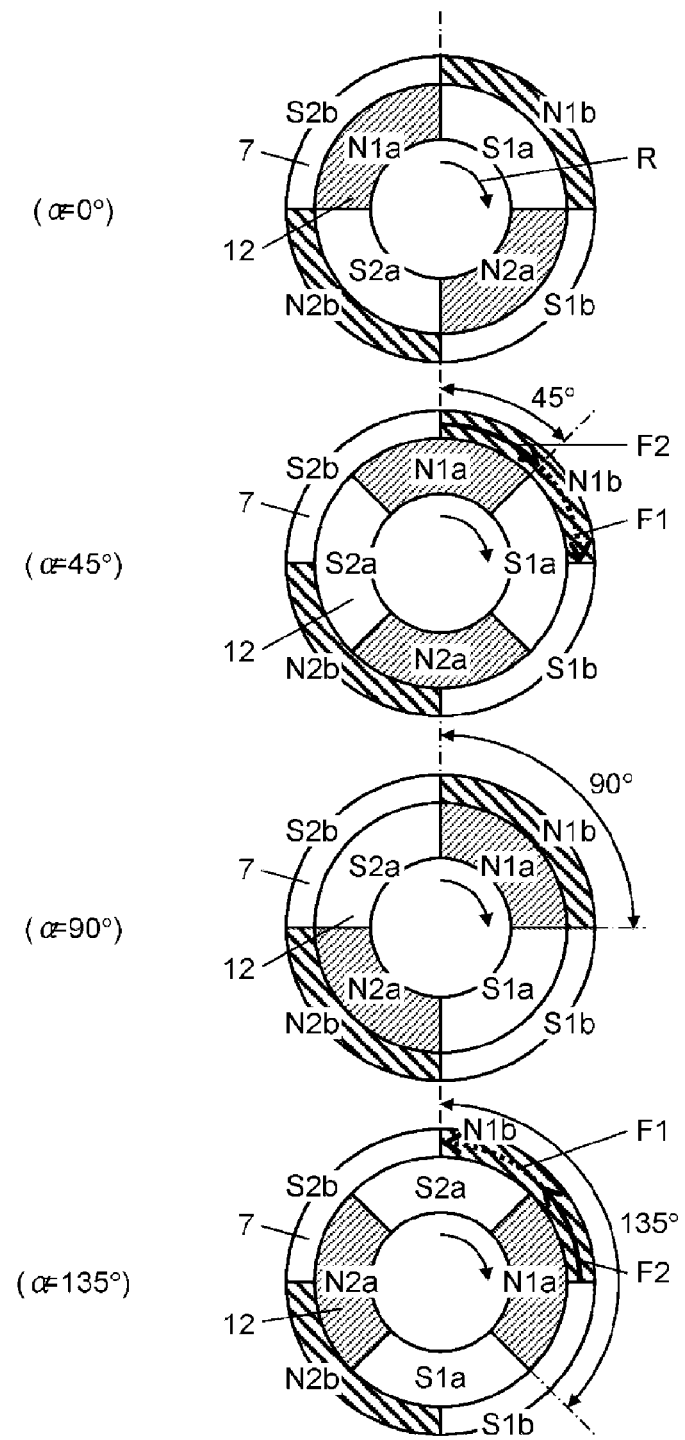
FIG. 18 is a diagram schematically showing a rotational deviation angle and force exerted on magnets in magnetic coupling.

FIG. 18 is a diagram schematically showing a rotational deviation angle and forces exerted on magnets. FIG. 18 shows a change in magnetic coupling involved with the rotational deviation angle in the magnetic coupling configuration using four poles between device-side magnet 12 and magnet 7 in the present exemplary embodiment. FIG. 18 is a view when magnet 7 and device-side magnet 12 are viewed from bottom, wherein the outer diameter of magnet 7 is depicted as larger than the outer diameter of device-side magnet 12 for easy understanding of the positional relation between both magnets.

Figure 19:
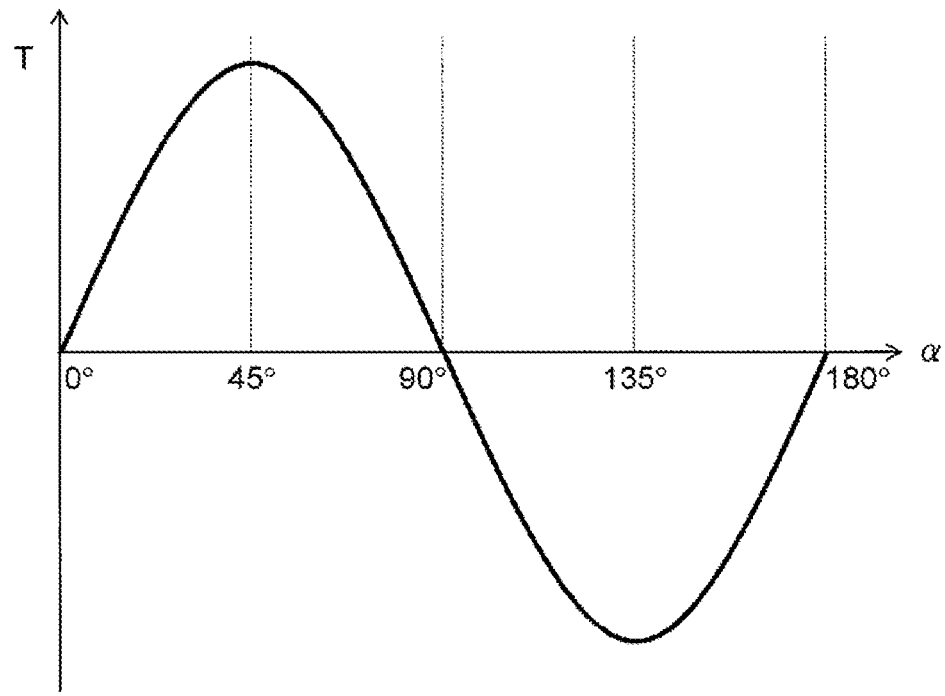
FIG. 19 is a diagram showing a correlation between a rotational deviation angle in magnetic coupling and a rotational torque.
Figure 20:
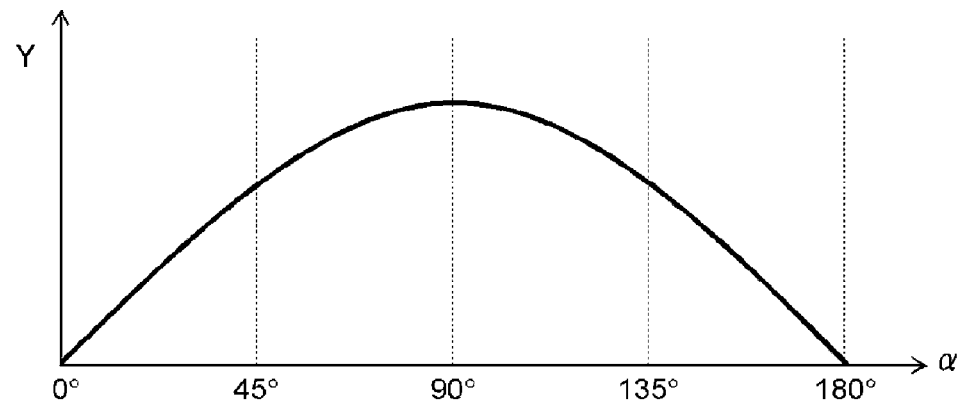
FIG. 20 is a diagram showing a correlation between a rotational deviation angle in magnetic coupling and a range where flow of magnetic force exists at an outside of a device-side magnet in a radial direction.
Figure 21:
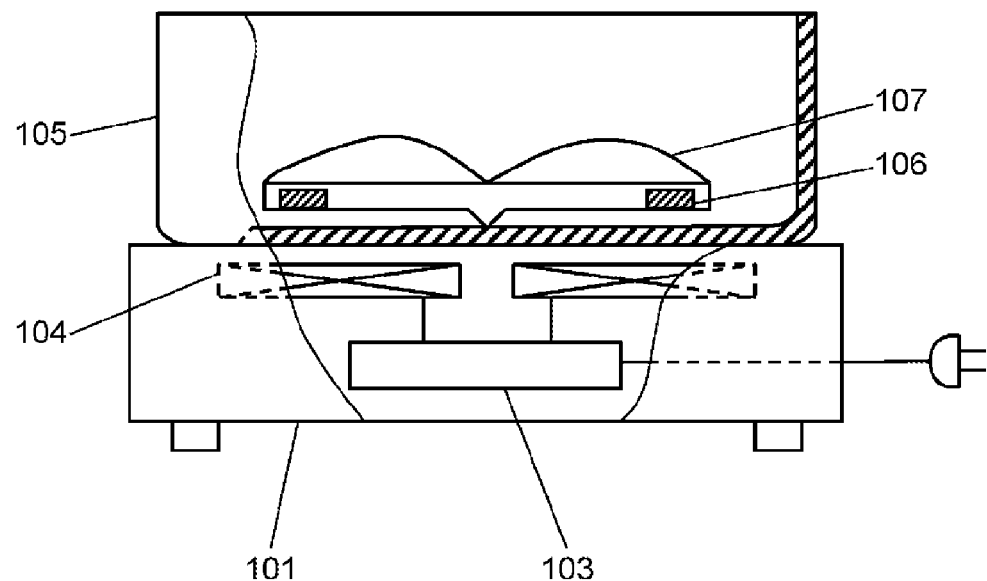
FIG. 21 is a sectional view showing a conventional rotary heating cooker.
Figure 22:
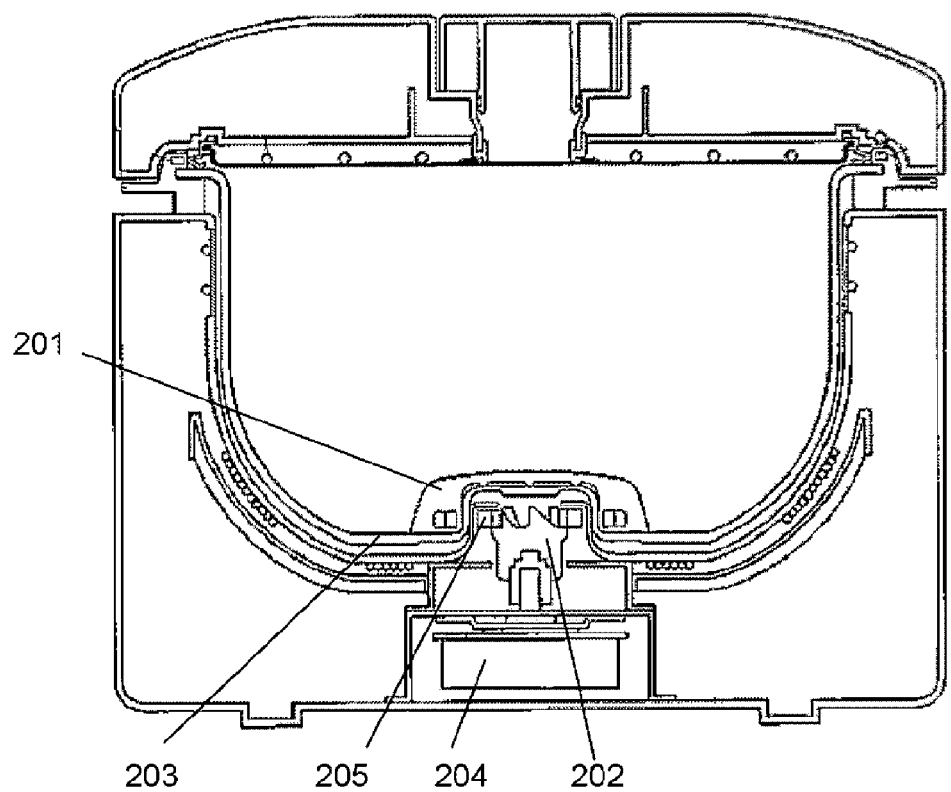
FIG. 22 is a sectional view showing a conventional electric rice cooker.
Figure 23:
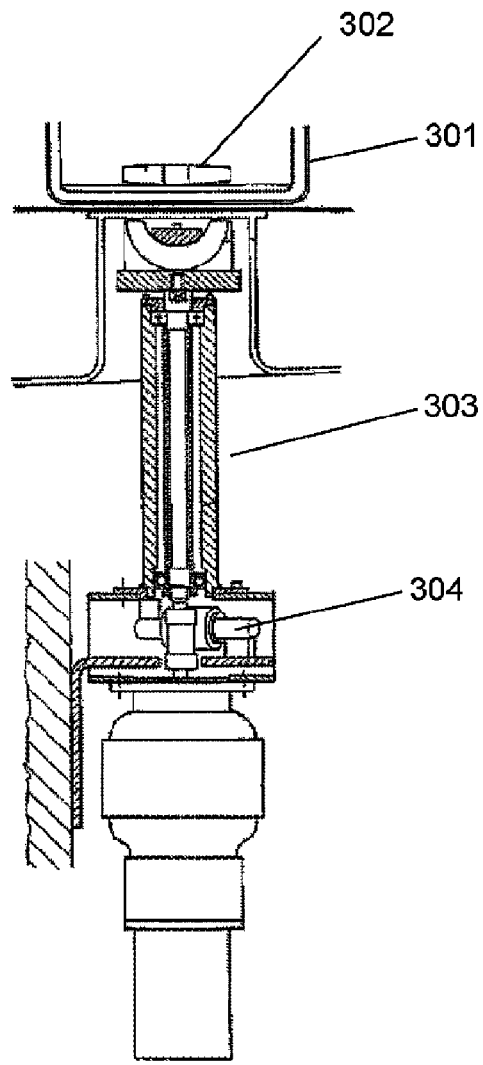
FIG. 23 is a sectional view showing a conventional stirring device.

FIG. 19 is a diagram showing a correlation between rotational deviation angle α in the magnetic coupling and rotational torque T. FIG. 20 is a diagram showing a correlation between rotational deviation angle α in the magnetic coupling and a range (radial distance Y) where flow of magnetic force exists at the outside of the device-side magnet in the radial direction.

In the 4-pole magnetic coupling configuration in the present exemplary embodiment, rotational torque T is zero when rotational deviation angle α is 0°, and with the increase in rotational deviation angle α, rotational torque T increases. When rotational deviation angle α is 45°, rotational torque T becomes the maximum.

Rotational torque T is generated by an action of attractive force F1 and repulsive force F2 generated between magnet 7 and device-side magnet 12 while device-side magnet 12 serving as a drive-side magnet rotates.

For easy understanding, magnetic pole N1b which is one of magnetic poles on magnet 7 receiving a rotational force from device-side magnet 12 will be described.

In FIG. 18, when rotational deviation angle α is 0°, magnetic pole N1b receives only attractive force F1 from magnetic pole S1a of device-side magnet 12 and does not receive repulsive force F2 from device-side magnet 12.

With an increase in rotational deviation angle α, magnetic pole N1b receives repulsive force F2 (thick arrow) from magnetic pole N1a as well as attractive force F1 (dotted arrow) from magnetic pole S1a. Therefore, repulsive force F2 increases, whereby rotational torque T increases.

Then, when rotational deviation angle becomes 45°, the repulsive force received by magnetic pole N1b from magnetic pole N1a and the attractive force received by magnetic pole N1b from magnetic pole S1a are substantially equal to each other. With this state, rotational torque T is the maximum.

When rotational deviation angle α further increases, repulsive force F2 received by magnetic pole N1b from magnetic pole N1a becomes larger than attractive force F1 received by magnetic pole N1b from magnetic pole S1a. Therefore, rotational torque T gradually decreases.

When rotational deviation angle α becomes 90°, magnetic pole N1b receives only repulsive force F2 from magnetic pole N1a, so that rotational torque T becomes zero.

When rotational deviation angle α further increases, magnetic pole N1b receives repulsive force F2 from magnetic pole N1a, and at the same time, starts to receive attractive force F1 from magnetic pole S2a. Thus, rotational torque T in a direction reverse to the direction of abovementioned rotational torque T increases.

Accordingly, rotational torque T varies as shown in FIG. 19 with the change in rotational deviation angle α. Specifically, with the increase in rotational deviation angle α from 0° to 180°, rotational torque T varies as a sine curve in which 180° serves as one cycle.

On the other hand, regarding magnet 7 and device-side magnet 12, the range (radial distance Y) where flow of magnetic force exists at the radially outside portion varies with rotational deviation angle α as shown in the schematic diagram of FIG. 20.

When magnet 7 and device-side magnet 12 repel each other, the flow of magnetic force in the magnetic coupling between both magnets decreases. Meanwhile, flow of magnetic force occurs between adjacent poles in each magnet. With this state, distance Y increases.

Specifically, as the rotational deviation angle increases from 0° to 90°, repulsive force F2 received by magnetic pole N1b from magnetic pole N1a increases, whereby distance Y becomes the maximum at the point at which rotational deviation angle α is 90°.

Therefore, distance Y varies as shown in FIG. 20 with a change in rotational deviation angle α. Specifically, with the increase in rotational deviation angle α from 0° to 180°, distance Y varies as a sine curve in which 180° serves as a half cycle. That is, when rotational deviation angle α is 0° and 180°, distance Y is zero. When rotational deviation angle α is 90°, distance Y is the maximum.

Accordingly, when detector 33 is disposed such that distance X between detector 33 and device-side magnet 12 is less than or equal to the maximum value of distance Y to detect a change in flow of magnetic force, loss of synchronization in the magnetic coupling can be detected in advance.

As described above, the heating/stirring cooker in the present disclosure can stir, while heating, the objects to be cooked accommodated in the container. Therefore, during cooking of a simmered dish that applies a large load, such as several plates of curry, the heating/stirring cooker can prevent an occurrence of scorching and uneven heating with no need to regularly stir the objects to be cooked with a rice scoop or the like.

Further, in the heating/stirring cooker according to the present exemplary embodiment, the stirring body is rotated in the reverse rotation direction as well as in the forward rotation direction at different rates during stirring of the object to be cooked. Therefore, the rotational force of the stirring body can also be applied to the objects to be cooked from the direction reverse to the forward rotation direction, whereby the objects to be cooked can be stirred, while an increase in load to the stirring body due to objects to be cooked being unevenly distributed can be prevented.

Further, even when the stirring body decelerates or stops due to an excess load being applied thereto, the stirring body rotates in the reverse rotation direction. Therefore, stop of rotation of the stirring body can be prevented before it occurs, or the stirring body can be released from its stopped state, without user intervention. Accordingly, the stirring body can continue stirring of the object to be cooked.

An overload state can be eliminated by rotating the stirring body in the reverse rotation direction as well as in the forward rotation direction, whereby a large torque is unnecessary. Thus, the torque of the stirring body can be set low. Therefore, the object to be cooked can be prevented from becoming mushy, for example, due to excessive stirring. Accordingly, a heating/stirring cooker having excellent stirring performance can be provided. Further, the configuration described above eliminates a need of a large torque. Therefore, the stirring body and the heating/stirring cooker can be downsized and reduced in weight, and thus, are easy to handle.

In addition, the heating/stirring cooker has the detector, thereby being capable of detecting a state of the stirring body. When the direction of rotation of the stirring body is switched to the reverse rotation direction based on the detection result, an overload state of the stirring body can be eliminated.

After the elimination of the overload state of the stirring body, control for returning the operation to the normal stirring operation is performed, whereby the stirring operation can be executed with stability.

Accordingly, the user does not need to open the lid of the heating/stirring cooker and watch the cooking until the cooking is finished, fearing a failure in cooking due to improper stirring. Thus, usability is improved. Specifically, the user only inputs the objects to be cooked in advance before the start of the cooking, and does not need effort until the end of the cooking.

Further, because the user does not need to open the lid, a heat loss which would be caused by opening the lid can be prevented.

Accordingly, the scope of the present disclosure may be applied to a cooker provided with a lid which is locked during cooking, a cooker provided with an operation unit or display unit on a lid, or a cooker with timer, for example.

It is to be noted that the components described above can be appropriately selected and combined, or components having similar functions can be appropriately employed and combined so that the effect of the present disclosure can be obtained.

For example, the heating unit is not limited to a resistive heater. For example, a heating unit using induction heating, steam, hot air, radiation heating, or the like may be used.

The present exemplary embodiment mainly shows the configuration where the stirring body has the clutch unit. However, such a configuration where the clutch unit is not provided may be applied as a lock inhibition mechanism that inhibits the stirring body from stopping its rotation due to a load and becoming non-rotatable (locked).

The non-rotatable state occurs, when a load exceeds the driving torque of the stirring body because a portion of the objects to be cooked which get stuck between the blade of the stirring body and the inner wall of the container due to the rotational operation of the blade applies resistance to the blade.

Therefore, the number of rotations in the forward rotation direction and the number of rotations in the reverse rotation direction may be determined according to an amount and kind of the objects to be cooked, and the rotation may be switched. In addition, the direction of rotation of the stirring body may be switched between the forward rotation direction and the reverse rotation direction based on detection of the rotational load which indicates a variation in load of the magnetic field generator. This configuration can also provide an effect of continuing the stirring operation by avoiding the non-rotatable state of the stirring body.

INDUSTRIAL APPLICABILITY

As described above, the heating/stirring cooker in the present disclosure has improved stirring performance and improved usability, thereby being applicable to cookers such as electric pressure cookers and multi-cookers, for example.

REFERENCE MARKS IN THE DRAWINGS 1 main body
2 container
3 container housing section
4 heater
6 stirring body
7 magnet
8 clutch unit
9 housing portion
10 blade
11 magnetic field generator
12 device-side magnet
13 coupling portion
14 motor
17 magnetic metal plate
18 opening
19 clutch claw portion
20a base part
20b claw
20c flat part
21 columnar portion
22 clutch engagement portion
22a base part
23 engagement part
24 bushing
25 receiving part
26 shaft unit
26a shaft
27 spring
28 slide part
29 magnetic metal body
30a, 30b inclined surface
32 fixing portion
33 detector
50 controller
100 heating/stirring cooker

The invention claimed is:

1. A heating/stirring cooker comprising:
a main body;
a container that is disposed inside the main body and configured to accommodate an object to be cooked;
a stirring body that is detachable from the container, the stirring body having a blade for stirring the object to be cooked in the container and a magnet disposed at a position facing an inner bottom part of the container in a state in which the stirring body is disposed inside the container;
a magnetic field generator that is disposed inside the main body and configured to generate a rotating magnetic field so that a rotational force of the rotating magnetic field acts on the magnet; and
a controller that is disposed inside the main body and configured to control the magnetic field generator, wherein:
the controller is configured to control the magnetic field generator so that: (i) a direction of rotation of the rotating magnetic field is switched between a forward rotation direction and a reverse rotation direction that is reverse to the forward rotation direction; and (ii) a number M of rotations in the reverse rotation direction is less than a number N of rotations in the forward rotation direction;
the controller is configured to switch the direction of rotation of the rotating magnetic field, at least either when the rotating magnetic field makes a set number of rotations which has been set in advance for the forward rotation direction and the reverse rotation direction or when a change in a rotational state of the stirring body is detected;
in a case where the direction of rotation of the rotating magnetic field is switched when the rotating magnetic field makes the set number of rotations which has been set in advance for the forward rotation direction and the reverse rotation direction, a ratio of the number M of rotations to the number N of rotations is within a range from 0.1 to 0.9;
in the case in which the direction of rotation of the rotating magnetic field is switched when the rotating magnetic field makes the set number of rotations which has been set in advance for the forward rotation direction and the reverse rotation direction, the number M of rotations is within a range from 1 to 2; and
the blade is configured to gather the object to be cooked during rotation in the forward rotation direction and break up the object to be cooked during rotation in the reverse rotation direction.

2. A cooker comprising:
a main body;
a container that is disposed inside the main body and configured to accommodate an object to be cooked;
a stirring body that is detachable from the container, the stirring body having a blade for stirring the object to be cooked in the container and a magnet disposed at a position facing an inner bottom part of the container in a state in which the stirring body is disposed inside the container;
a magnetic field generator that is disposed inside the main body and configured to generate a rotating magnetic field so that a rotational force of the rotating magnetic field acts on the magnet and
a controller that is disposed inside the main body and configured to control the magnetic field generator, wherein:
the controller is configured to control the magnetic field generator so that: (i) a direction of rotation of the rotating magnetic field is switched between a forward rotation direction and a reverse rotation direction that is reverse to the forward rotation direction; and (ii) a number M of rotations in the reverse rotation direction is less than a number N of rotations in the forward rotation direction;
the controller is configured to switch the direction of rotation of the rotating magnetic field, at least either when the rotating magnetic field makes a set number of rotations which has been set in advance for the forward rotation direction and the reverse rotation direction or when a change in a rotational state of the stirring body is detected; and
the magnetic field generator includes:
a device-side magnet disposed at a position facing the magnet and a rotational driving unit configured to rotate the device-side magnet; and
a detector disposed inside the main body, the detector being configured to detect a magnetic coupling state between the magnet and the device-side magnet so as to detect the change in the rotational state of the stirring body.

3. The heating/stirring cooker according to claim 2, wherein
the detector is configured to detect a change in flow of magnetic force in magnetic coupling between the magnet and the device-side magnet.

4. The cooker according to claim 3, wherein
the controller is configured to switch the direction of rotation of the rotating magnetic field to the reverse rotation direction, when the detector detects the change in flow of magnetic force in magnetic coupling between the magnet and the device-side magnet with the rotating magnetic field rotating in the forward rotation direction.

5. The cooker according to claim 4, wherein:
the number M of rotations in the reverse rotation direction after the direction of rotation of the rotating magnetic field is switched to the reverse rotation direction is less than or equal to 2; and
when the rotating magnetic field makes the number M of rotations, the direction of rotation of the rotating magnetic field is switched to the forward rotation direction.

6. The cooker according to claim 3, wherein:
the detector is outside the device-side magnet in a radial direction with respect to a rotation center of the device-side magnet so as to face the device-side magnet; and
the detector is configured to detect the change in flow of magnetic force outside the device-side magnet.

7. The cooker according to claim 4, wherein:
the detector is outside the device-side magnet in a radial direction with respect to a rotation center of the device-side magnet so as to face the device-side magnet; and
the detector is configured to detect the change in flow of magnetic force outside the device-side magnet.

8. The cooker according to claim 5, wherein:
the detector is outside the device-side magnet in a radial direction with respect to a rotation center of the device-side magnet so as to face the device-side magnet; and
the detector is configured to detect the change in flow of magnetic force outside the device-side magnet.

* * * * *